(12) United States Patent
Onda

(10) Patent No.: US 7,646,458 B2
(45) Date of Patent: Jan. 12, 2010

(54) LIQUID CRYSTAL DISPLAY DEVICE AND METHOD OF MANUFACTURING THE SAME

(75) Inventor: Shinya Onda, Kanagawa (JP)

(73) Assignee: NEC LCD Technologies, Ltd., Kanagawa (JP)

(*) Notice: Subject to any disclaimer, the term of this patent is extended or adjusted under 35 U.S.C. 154(b) by 295 days.

(21) Appl. No.: 11/582,453

(22) Filed: Oct. 18, 2006

(65) Prior Publication Data
US 2007/0091247 A1    Apr. 26, 2007

(30) Foreign Application Priority Data
Oct. 21, 2005    (JP) ............................. 2005-307468

(51) Int. Cl.
*G02F 1/1337* (2006.01)
(52) U.S. Cl. ....................... 349/125; 349/123
(58) Field of Classification Search ................ None
See application file for complete search history.

(56) References Cited

U.S. PATENT DOCUMENTS

| 7,102,723 B2 * | 9/2006 | Byun et al. ............... 349/156 |
| 2005/0073638 A1 * | 4/2005 | Byun et al. ............... 349/156 |

FOREIGN PATENT DOCUMENTS

| CN | 1400500 A | 3/2003 |
| CN | 1605915 A | 4/2005 |
| JP | 2001-330837 | 11/2001 |
| JP | 2003-43497 A | 2/2003 |
| JP | 2004-325525 A | 11/2004 |
| JP | 2004325525 A | * 11/2004 |

* cited by examiner

*Primary Examiner*—Sung H Pak
(74) *Attorney, Agent, or Firm*—Young & Thompson

(57) ABSTRACT

Provided is a method of manufacturing an LCD device in which alignment films are formed by a method of printing non-contact alignment films on substrates. Print control patterns are provided between a sealing member and each of display regions. Each of the print control patterns is formed of a highly water-repellent region as well as any one of fine concave structures, fine convex structures and pillar-shaped bodies. The print control patterns control the spreading as liquid of alignment film materials to make the film thickness of each of the alignment film materials uniform.

30 Claims, 19 Drawing Sheets

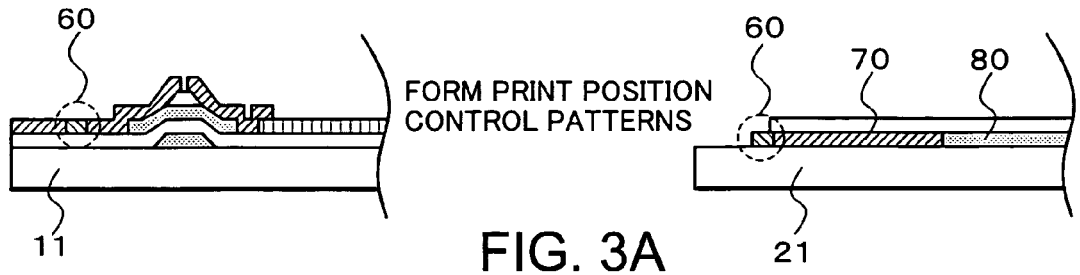
FIG. 3A FORM PRINT POSITION CONTROL PATTERNS
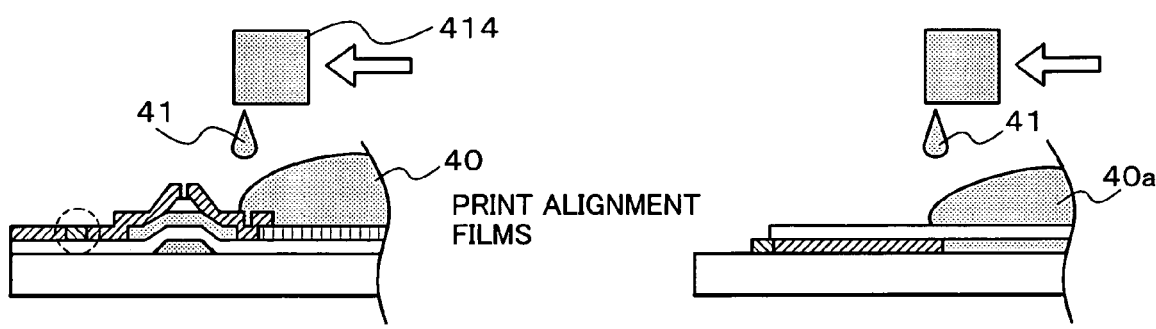
FIG. 3B PRINT ALIGNMENT FILMS
FIG. 3C SPREAD OF ALIGNMENT FILM
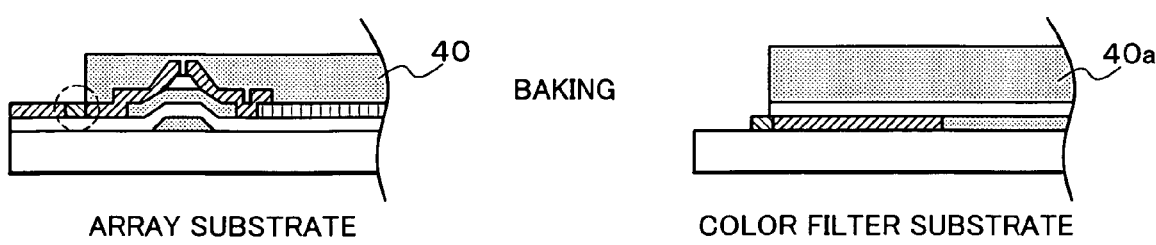
FIG. 3D BAKING
ARRAY SUBSTRATE    COLOR FILTER SUBSTRATE

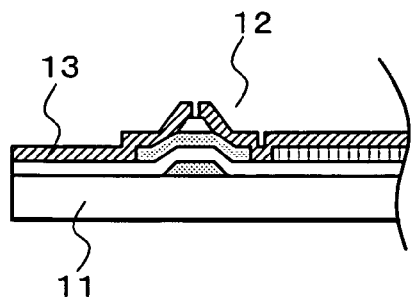
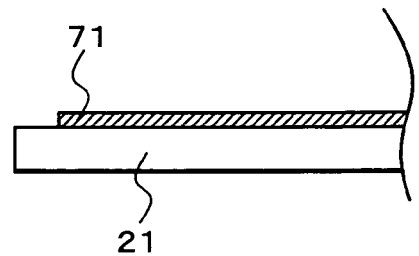
DEPOSITION
FIG. 9A
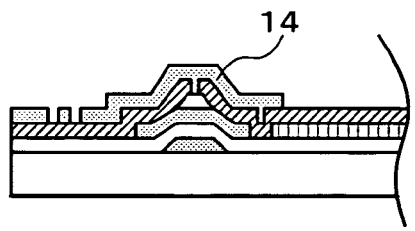
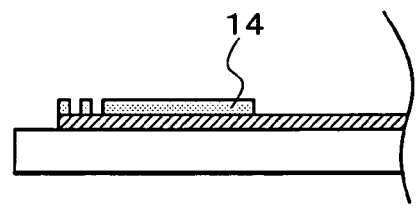
EXPOSURE
FIG. 9B
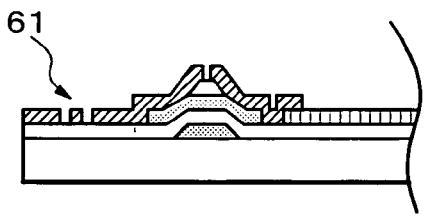
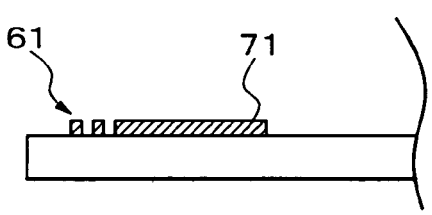
ETCHING
FIG. 9C
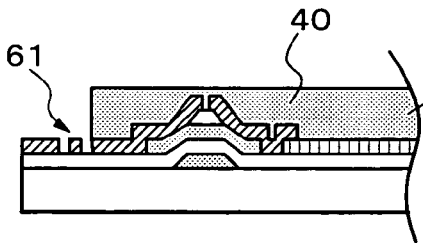
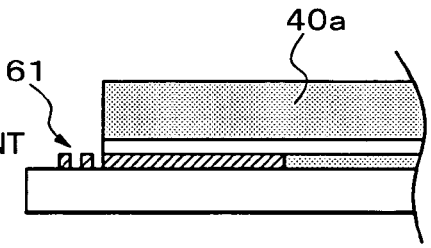
PRINT ALLIGNMENT FILMS
ARRAY SUBSTRATE
COLOR FILTER SUBSTRATE
FIG. 9D

CONVEX STRUCTURES    CONCAVE STRUCTURES

CONVEX STRUCTURES

CONCAVE STRUCTURES

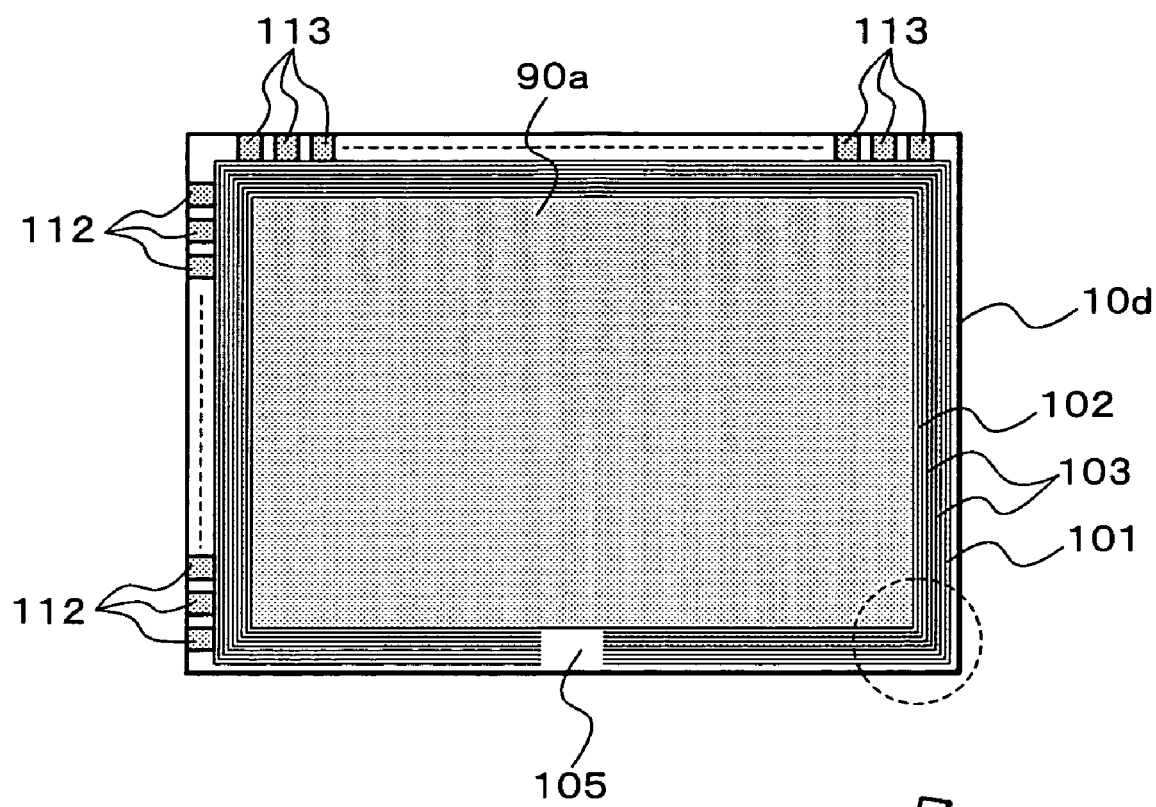
**FIG. 19A
(PRIOR ART)**
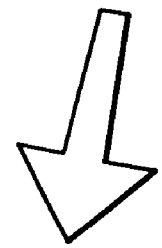
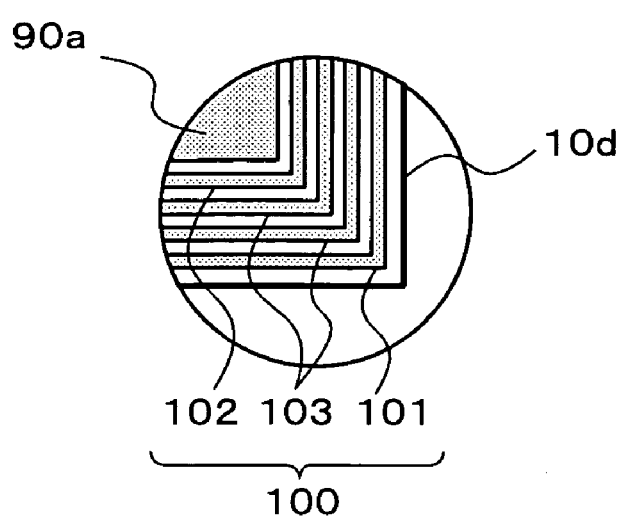
**FIG. 19B
(PRIOR ART)**

LIQUID CRYSTAL DISPLAY DEVICE AND METHOD OF MANUFACTURING THE SAME

BACKGROUND OF THE INVENTION

1. Field of the Invention

The present invention relates to a liquid crystal display (LCD) device including alignment films formed by a non-contact method, and a method of manufacturing the same. The present invention particularly relates to the LCD device in which accuracy of a film thickness and contour shape of edge portions of the respective alignment films is improved, and a method of manufacturing the same.

2. Description of the Related Art

Generally, in an LCD device, a liquid crystal layer is interposed between a substrate including switching elements and another substrate opposite to this substrate, and alignment films are provided to interfaces each between this liquid crystal layer and the substrates. By applying an alignment treatment such as rubbing to the alignment films, liquid crystal molecules in vicinities of the substrates can be respectively aligned in single directions corresponding to the alignment films, the liquid crystal molecules being in the liquid crystal layer.

As a method of manufacturing the alignment film, a method of manufacturing the same by printing is known. An alignment film printing method of a non-contact type such as an ink-jet method has been proposed for the purpose of such as preventing foreign substances from accreting to the film from a manufacturing device, in a case where the alignment film is printed. In the alignment film printing method of this non-contact type, an alignment film material is discharged as extremely small droplets onto the substrate at equal intervals from a remote position above the substrate. The droplets of the alignment film material, which landed on the substrate, spread as liquid while gradually leveling off by self-weight, thereby an alignment film with a uniform film thickness is expected to be formed.

However, in practice, the droplets of the alignment film material, which landed on the outermost periphery of a printed region, spread as liquid also in the direction toward the periphery of the printed region, therefore the film thickness is unlikely to be uniform in the periphery of the printed region. Moreover, since the droplets of the alignment film material, which landed on the substrate, tend to spread as liquid along patterns such as wirings, there is a problem that controllability of the film thickness and the contour shape in the printing edge portions is poor.

SUMMARY OF THE INVENTION

Accordingly, an exemplary feature of the invention is to provide a method of manufacturing an LCD device, the method making it possible to improve patterning accuracy of the edge portions of the respective alignment films when forming the alignment films by a method of printing in non-contact with the substrates. Another exemplary feature of the invention is to provide an LCD device manufactured by such a manufacturing method.

Moreover, still another exemplary feature of the invention is to provide a method of manufacturing an LCD device, the method making it possible to form alignment films with a highly uniform film thickness when forming the alignment films in a similar way. Yet another exemplary feature of the invention is to provide an LCD device manufactured by such a manufacturing method.

A liquid crystal display device of the invention includes: a pair of substrates each including a display region and a peripheral region around the display region; a liquid crystal layer sandwiched between the substrates; a sealing member provided between the peripheral regions of the pair of substrates, the sealing member sealing the liquid crystal layer; alignment films provided between a surface of one of the pair of substrates and the liquid crystal layer, and between a surface of the other of the pair of substrates and the liquid crystal layer; and print position control patterns provided between the sealing member and the display region, the print position control patterns each being made of a member for repelling a corresponding one of alignment film materials which form the alignment films.

It is preferable that each of the print position control patterns is arranged between the display region and the sealing member.

It is preferable that the print position control patterns respectively consist of regions each of which can easily repel the alignment film material.

It is preferable that the regions which can easily repel the corresponding alignment film materials respectively consist of regions with water repellency to the alignment film materials.

It is preferable that the print position control patterns respectively consist of structures which can easily repel the corresponding alignment film materials.

It is preferable that the print position control patterns respectively consist of pillar-shaped bodies which are in contact with corresponding opposed substrates, and which support the substrates to keep a cell gap.

It is preferable that each of the structures which can easily repel the corresponding alignment materials consists of a structure of a pattern repeating at least one of a concave structure and a convex structure.

It is preferable that a width of each of depression portions of the repeated concave structures or the repeated convex structures of each of the print position control patterns is 50 µm or less.

It is preferable that an area ratio of the depression portions of the repeated concave structures or the repeated convex structures of each of the print position control patterns to a region of the print position control pattern is ½ or more.

It is preferable that a depth of each of depressions of the repeated concave structures or the repeated convex structures of each of the print position control patterns is 50 nm or more.

A method of manufacturing a liquid crystal display device of the invention is a method of manufacturing a liquid crystal display device including a pair of substrates each including a display region and a peripheral region around the display region; a liquid crystal layer sandwiched between the pair of substrates; and a sealing member provided between the peripheral regions of the pair of substrates, the sealing member sealing the liquid crystal layer, the method including the steps of: forming print position control patterns each made of a member for repelling a corresponding one of alignment film materials which form alignment films, outside the respective display regions of the pair of substrates, forming alignment films respectively on the display regions of the pair of substrates by a non-contact printing method, and bonding the pair of substrates with the sealing member, and interposing the liquid crystal layer between the pair of substrates.

It is preferable that the print position control patterns are respectively formed of regions each of which can easily repel the alignment film material.

It is preferable that the regions which can easily repel the corresponding alignment film materials are respectively formed of regions with water repellency which suppresses the spreading of printing the alignment films.

It is preferable that the print position control patterns are respectively formed of structures which can easily repel the corresponding alignment film materials.

It is preferable that the structures which can easily repel the corresponding alignment film materials are respectively formed of regions including concave structures or convex structures which suppress the spreading of printing the alignment films.

It is preferable that a width of each of depression portions of the concave structures or the convex structures of each of the print position control patterns is 50 μm or less.

It is preferable that an area ratio of the depression portions of the concave structures or the convex structures of each of the print position control patterns to a region of the print position control pattern is ½ or more.

It is preferable that a depth of each of depressions of the concave structures or the convex structures of each of the print position control patterns is 50 nm or more.

It is preferable that the regions including the concave structures or convex structures which suppress the spreading of printing the alignment film are formed by a photolithographic method.

It is preferable that the print position control patterns are formed with a non-contact organic material printing method.

It is preferable that the print position control patterns are respectively formed of pillar-shaped bodies which enclose the corresponding display regions, and which support the pair of substrates to keep a cell gap.

It is preferable that the pillar-shaped bodies are formed by depositing color filter layers.

It is preferable that the non-contact printing method is based on an ink-jet printing method.

It is preferable that the ink-jet printing method causes droplets of the alignment film material to be discharged by controlling piezoelectric elements.

It is preferable that the ink-jet printing method causes droplets of the alignment film material to be discharged by controlling heaters.

It is preferable that the non-contact printing method is based on a dispense printing method.

According to the method of manufacturing the liquid crystal display device of the invention, there are formed print position control patterns each made of a member for repelling the alignment film material which forms the alignment films, outside the display regions of the pair of substrates. This results in the exemplary advantages as follows.

According to the invention, when forming alignment films by the non-contact printing method, even if the alignment film material spreads as liquid in the direction toward the periphery of the display regions, the print position control patterns can repel the alignment film material to thereby control the spreading as liquid of the alignment film material. This makes it possible to form alignment films having small variations in the film thickness between the center of the display region and the edge portion of the display region. Because it is possible to control the spreading as liquid of the alignment film material, the patterning of the edge portion of the alignment film is facilitated.

According to the liquid crystal display device of the invention, between the sealing member and the display region, there are provided print position control patterns each made of a member for repelling the alignment film material which forms the alignment films. This results in the exemplary advantages as follows.

According to the invention, when forming alignment films by the non-contact printing method, even if the alignment film material spreads as liquid in the direction toward the periphery of the display region, it is possible to control the spreading as liquid of the alignment film material by the print position control patterns which repel the alignment film material. Accordingly, it is possible to obtain the liquid crystal display device in which the film thickness of the alignment films is uniform with no irregularity, and in which the patterning accuracy of the alignment films is excellent. Moreover, as a result that the patterning accuracy of the alignment films has been improved, it is possible to realize the liquid crystal display device which has no display irregularity, to improve the display quality of the liquid crystal display device, and to downsize the liquid crystal display device.

BRIEF DESCRIPTION OF THE DRAWINGS

These and other objects and advantages and further description of the invention will be more apparent to those skilled in the art by reference to the description, taken in connection with the accompanying drawings, in which:

FIGS. 3A to 3D are cross sectional views of an array substrate and a color filter substrate of the LCD device in order of manufacturing steps for explaining an alignment film printing process of a first embodiment of the invention;

FIG. 4, and FIGS. 7B and 7C are cross sectional views for explaining the operation of the print head of FIG. 7A;

FIG. 9A to FIG. 9D are cross sectional views showing the structure of the array substrate and the color filter substrate of the LCD device in order of manufacturing steps for explaining the alignment film printing process of FIG. 8;

FIG. 19A is a plane view of an array substrate of FIG. 18, and FIG. 19B is an enlarged partial view of FIG. 19A.

DETAILED DESCRIPTION OF THE PREFERRED EMBODIMENTS

Before describing preferred embodiments, the related arts are described with reference to the accompanying drawings.

Figure 16:
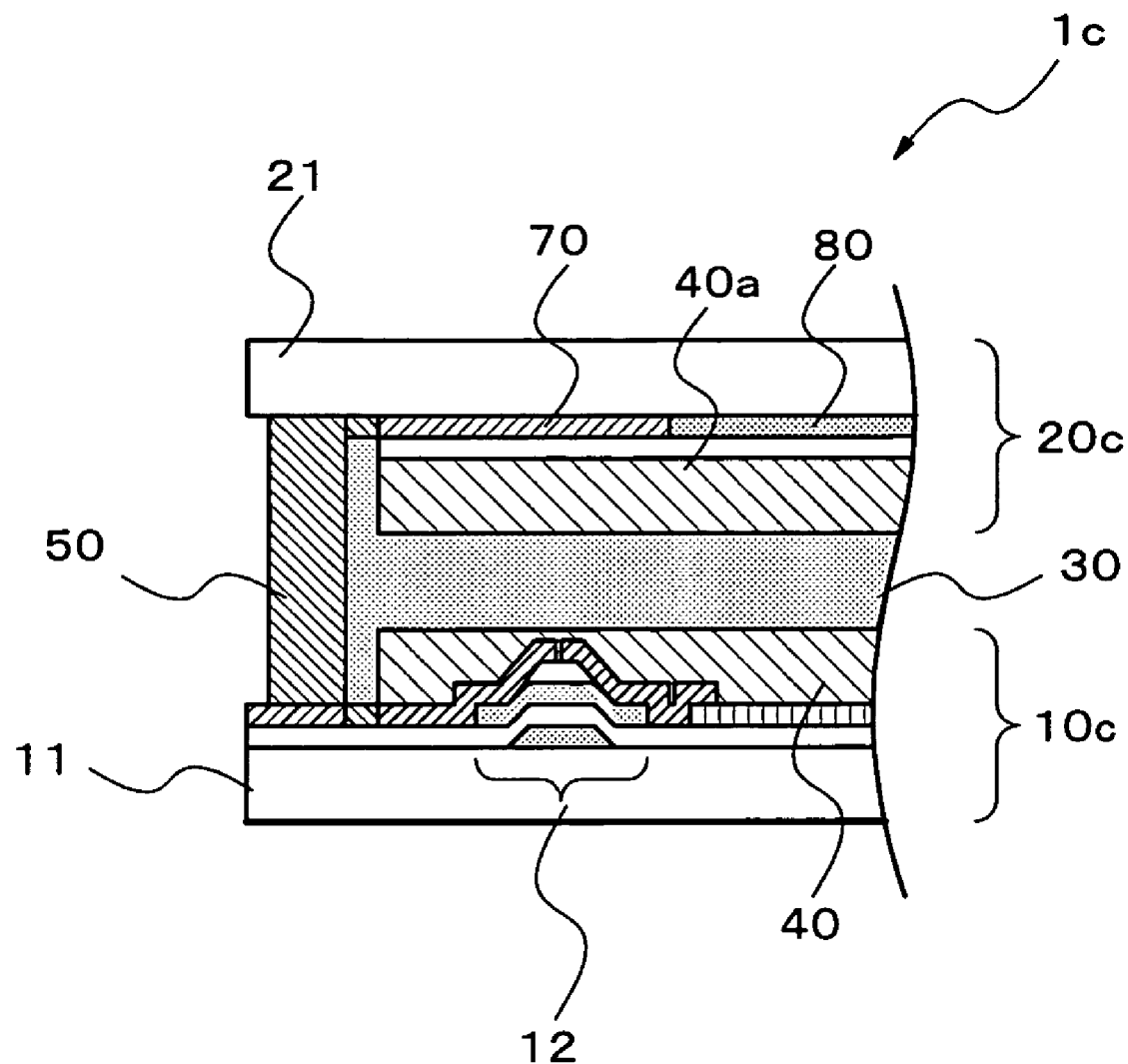
FIG. 16 is a cross sectional view showing a partial structure of an LCD device of a first related art.

Firstly, a first related art is described. Referring to FIG. 16, an LCD device 1c includes an array substrate 10c as a first substrate, a color filter substrate 20c as a second substrate, a sealing member 50 joining these first and second substrates, and a liquid crystal layer 30 interposed between the first and second substrates. Alignment films are provided on surfaces of the respective substrates, the surfaces being in contact with the liquid crystal layer 30. The array substrate 10c is provided with, on a substrate 11, thin film transistors (TFTs) 12 as switching elements, and pixel electrodes as well as other electrodes to serve as a display region, the pixel electrodes and the other electrodes being connected to the switching elements. The array substrate 10c is provided with an alignment film 40 on top of the substrate 11 on which these elements are provided. The color filter substrate 20c is provided with a-black matrix 70 and a color filter 80 on a substrate 21. The color filter substrate 20c is provided with an alignment film 40a on the black matrix 70 and the color filter 80. Moreover, the alignment films 40 and 40a are deposited by discharging the alignment material from above the respective substrates by the non-contact printing method and by baking them.

Figure 17A:
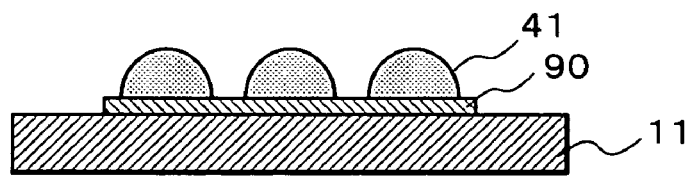
FIGS. 17A to 17D are cross sectional views for explaining the manufacturing process of alignment films in FIG. 16.
Figure 17B:
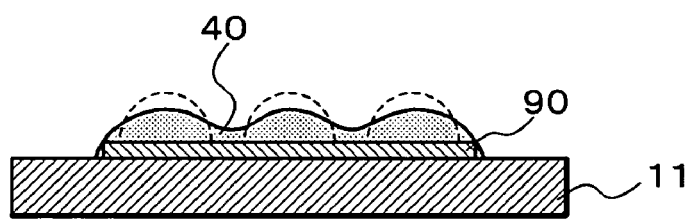
Figure 17C:
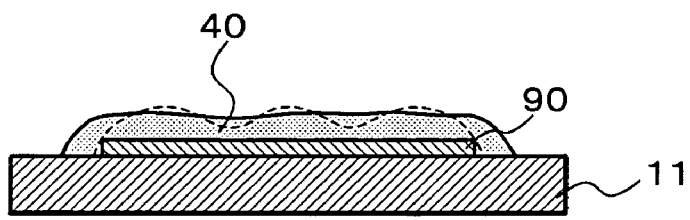
Figure 17D:
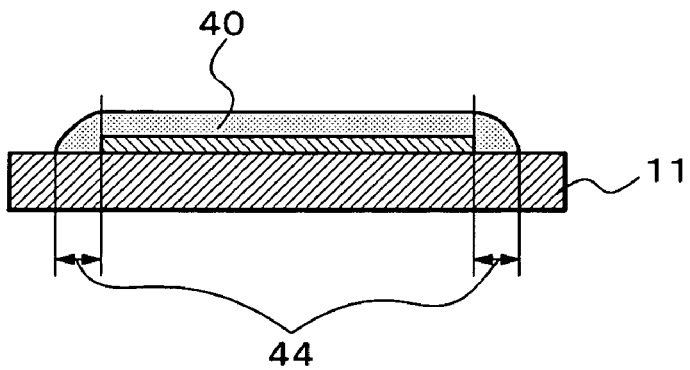

In the first related art, the alignment films 40 and 40a are formed as shown in the cross sectional views in order of the steps of FIGS. 17A to 17D. First, as shown in FIG. 17A, droplets 41 of an alignment film material are discharged to a display region 90 on the substrate 11. The droplets 41 of this alignment film material spread as liquid in the direction toward the periphery of the display region 90 while leveling off by self-weight gradually, as shown in FIGS. 17B and 17C. Then, as shown in FIG. 17D, the flat alignment film 40 is formed. However, in this case, the edge portion of the alignment film 40 results in a region 44 whose film thickness is small. Accordingly, there is a problem that the film thickness of the alignment film 40 is unlikely to be uniform.

Moreover, when the alignment film material is printed onto a long and narrow groove such as wirings, the printed alignment film material spreads as liquid along the groove. Therefore this causes a problem such as an uneven film thickness or wide variations of the spreading as liquid of the alignment film material at the edge portions of the respective alignment films. For this reason, it is extremely difficult to control the film thickness and the contour of the edge portions of the respective alignment films in the periphery of the display region in which wiring patterns are formed. If the alignment film extends in the direction toward the periphery of the panel along wirings at the alignment film edge, a part of the alignment film is formed under a sealing position. This decreases the reliability of the LCD device. In order to solve the above problems, the space between the display region and the seal needs to be widened, however this results in a wide bezel area of the LCD device.

Moreover, in the case of the alignment film formed by the alignment film printing method of the non-contact type, there is a problem that it is difficult to control uniformity of the film thickness. Because a resin such as a varnish printed onto the substrate spreads by self-weight, the resin is thick in the center of the print region and is slightly thin in the periphery. For this reason, the film thickness of the alignment film after evaporating solvent by the temporarily drying becomes large in the center and small in the periphery. In a case where the LCD device is assembled using the alignment films having variations in the film thickness, the alignment of the liquid crystal within a plane becomes uneven. Therefore this leads to a decrease in the display quality and reliability.

Figure 18A:
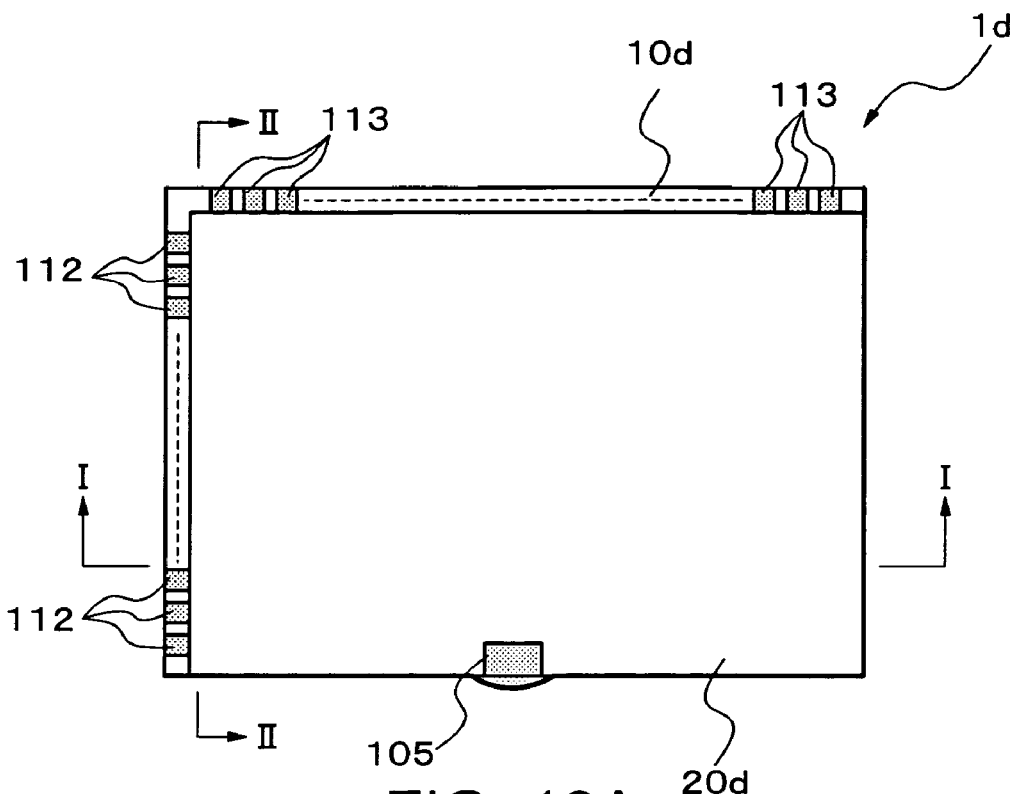
FIG. 18A is a plane view showing a partial structure of an LCD device of a second related art.
Figure 18B:
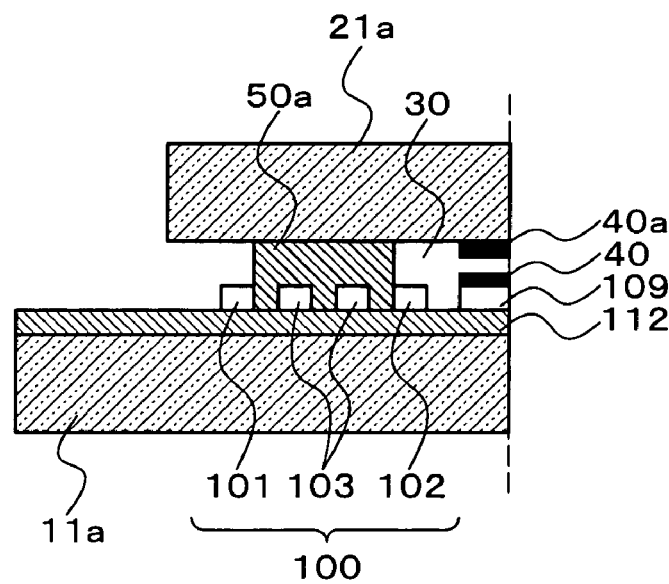
FIG. 18B is a partial sectional view taken along the I-I line or the II-II line of FIG. 18A.

Next, a second related art is described. As the second related art, there is an LCD device proposed in Japanese Patent Application Laid-Open. No. 2001-330837. As shown in FIGS. 18A and 18B, this LCD device 1d is configured by bonding an array substrate 10d and a color filter substrate 20d to each other with a sealing member 50a interposed in between, and by filling a liquid crystal material between the array substrate 10d and the color filter substrate 20d to provide a liquid crystal layer 30. On the array substrate 10d, a plurality of gate lines 112 and a plurality of drain lines 113 are arranged in a matrix. Pixel electrodes, the gate lines 112 and the drain lines 113 are connected via switching elements (not shown) which are arranged at each intersection of the gate lines 112 and the drain lines 113, and thereby a display region is configured.

Moreover, gate line driving circuits (not shown) and drain line driving circuits (not shown) are respectively connected to the gate lines 112 and the drain lines 113. Moreover, an alignment film 40 is formed on the pixel electrodes, the switching elements, the gate lines 112 and the drain lines 113, which are formed in this manner.

Moreover, as shown in FIG. 19B, several concavo-convex patterns 100 are formed in the peripheral region of the array substrate 10d. These concavo-convex patterns 100 are constituted of an outer concavo-convex pattern 101, intermediate concavo-convex patterns 103 and an inner concavo-convex pattern 102. The outer concavo-convex pattern 101 and the inner concavo-convex pattern 102 are formed in a frame shape respectively along the outside and inside of a pattern of the sealing member 50a in the peripheral region of the array substrate 10d. Here, the outer concavo-convex pattern 101 and the inner concavo-convex pattern 102 are formed in the peripheral region excluding a liquid crystal injection hole 105. Moreover, between the outer concavo-convex pattern 101 and the inner concavo-convex pattern 102 on the array substrate 10d, the intermediate concavo-convex patterns 103 of approximately the same shape as that of the outer concavo-convex pattern 101 and inner concavo-convex pattern 102 are formed similarly in the peripheral region excluding the liquid crystal injection hole 105.

These concavo-convex patterns 100 are made of a silica film or a silicon nitride film, which is strong as a coating film. Moreover, a color mosaic filter and a common electrode are provided on the color filter substrate 20d, and an alignment film 40a is formed on them. Then, an alignment treatment is performed on the alignment films 40 and 40a which are formed respectively on the array substrate 10d and the color filter substrate 20d. Thereafter, the alignment films 40 and 40a are caused to face to each other to thereby arrange the array substrate 10d and the color filter substrate 20d opposed to each other. The array substrate 10d and the color filter substrate 20d are bonded with a predetermined gap apart from each other by use of the sealing member 50a which has been applied in a frame shape. Moreover, liquid crystals are injected between the array substrate 10d and the color filter substrate 20d from the liquid crystal injection hole 105, and the liquid crystals are sealed by a sealing member.

The second related art proposes that, by forming such concavo-convex patterns 100 in the peripheral region of the array substrate 10d, to which the sealing member 50a is applied, the sealing member 50a is prevented from spreading out. With the outer concavo-convex pattern 101 and the inner concavo-convex pattern 102, a range for the sealing member 50a to spread out can be controlled, and a sealing width can be set to a predetermined width. In addition, as for the outer concavo-convex pattern 101, the inner concavo-convex pattern 102 and the intermediate concavo-convex patterns 103, the width and the height thereof are respectively set to 1 μm. The space between the inner concavo-convex pattern 102 and the outer concavo-convex pattern 101 is set to 0.55 mm. Moreover, the intermediate concavo-convex patterns 103 and the sealing member 50a together serve as a spacer for supporting the pair of substrates 10d and 20d.

Although the sealing member to be applied varies depending on positions on the substrate, the seal width of the sealing member can be set within a predetermined width by forming the inner concavo-convex pattern and the outer concavo-convex pattern, even if the array substrate 10d and the color filter substrate 20d are press-bonded with the sealing member 50d interposed in between in a seal adhesion process.

That is, the second related art describes that in the LCD device in which the electrodes and the alignment films are formed, the inner concavo-convex pattern 102 and the outer concavo-convex pattern 101 are formed as to enclose the sealing member 50a, and that the inner concavo-convex pattern 102 is formed as to enclose the display region 90a formed on one substrate of the pair of substrates. In the second related art, the concavo-convex patterns 101 and 102 are provided for preventing the sealing member 50 from flowing out, and it may appear that this concavo-convex pattern 102 exists between the alignment films 40 and 40a and the sealing member 50. However, because these concavo-convex patterns 101 and 102 act against the sealing member 50 and are for preventing the sealing member 50 from flowing out, they are formed after the alignment films 40 and 40a have been formed, and the alignment films 40 and 40a are not taken into consideration. Therefore, forming the alignment films in a uniform film thickness or doing the like is not taken into consideration.

Figure 1:
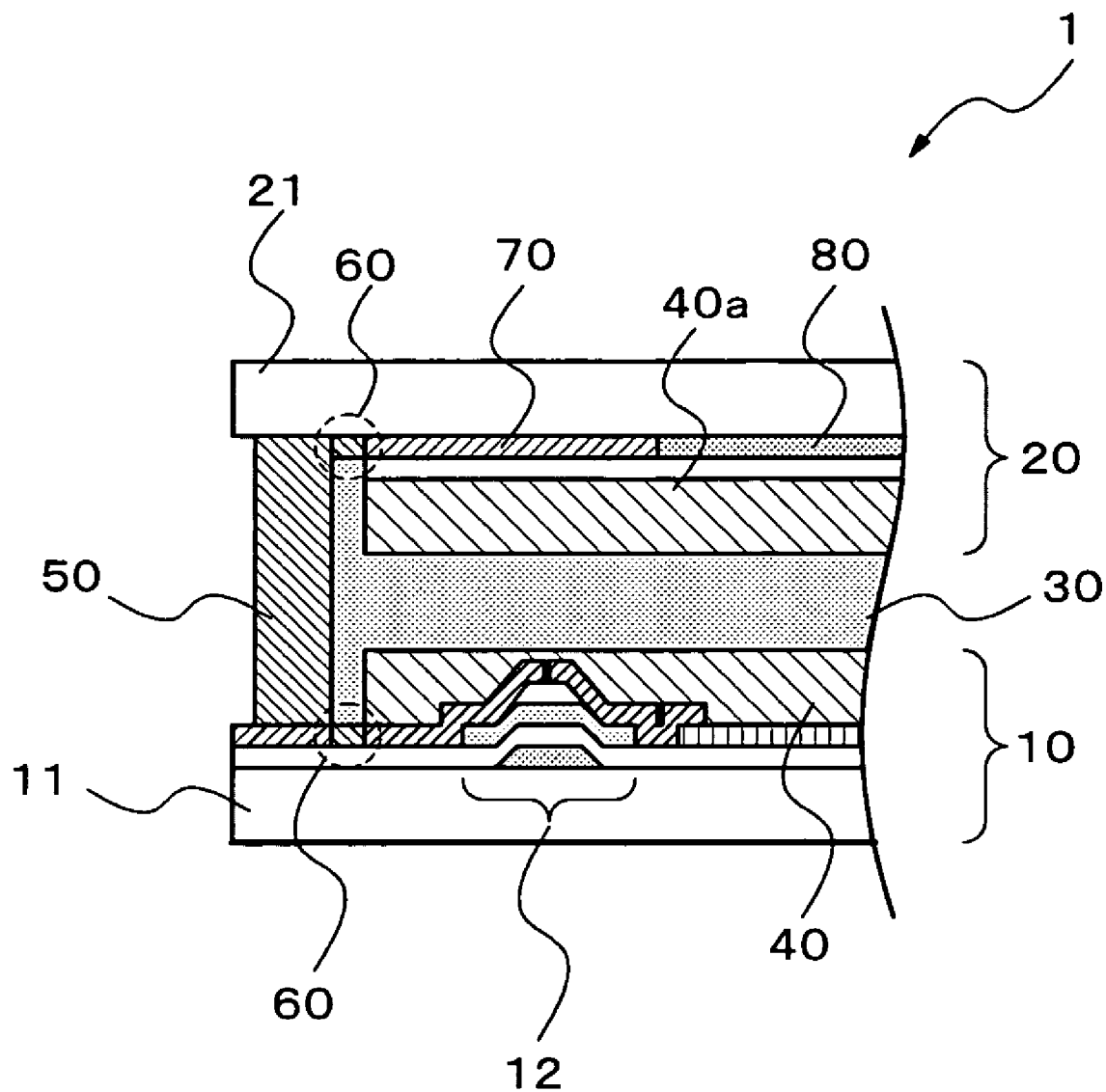
FIG. 1 is a cross sectional view showing a partial structure of an LCD device concerning an embodiment of the invention.

Next, embodiments of the invention will be described in detail with reference to the accompanying drawings. Referring to FIG. 1, an LCD device 1 includes an array substrate 10 as a first substrate, a color filter substrate 20 as a second substrate, a sealing member 50 joining the first substrate and second substrates, and a liquid crystal layer 30 interposed between the first and second substrates. Alignment films 40 and 40a are provided on the surfaces of the respective substrates, the surfaces being in contact with the liquid crystal layer 30.

The embodiments are characterized by forming, between the sealing member 50 and the display region on each of the substrates, a print position control pattern 60 made of a member capable of repelling an alignment film material which forms the alignment films 40 and 40a.

In addition, the array substrate 10 is provided with, on the substrate 11, TFTs 12 as switching elements, and pixel electrodes as well as other electrodes to serve as the display region, the pixel electrodes and the other electrodes being connected to the switching elements. The array substrate 10 is provided with the alignment film 40 on top of the substrate 11 on which these elements are provided. The color filter substrate 20 is provided with a black matrix 70 and a color filter 80 on the substrate 21. The color filter substrate 20 is provided with the alignment film 40a on the black matrix 70 and the color filter 80. Moreover, the alignment films 40 and 40a are deposited by discharging the alignment material from above the respective substrates by the non-contact printing method and by baking them.

Figure 2:
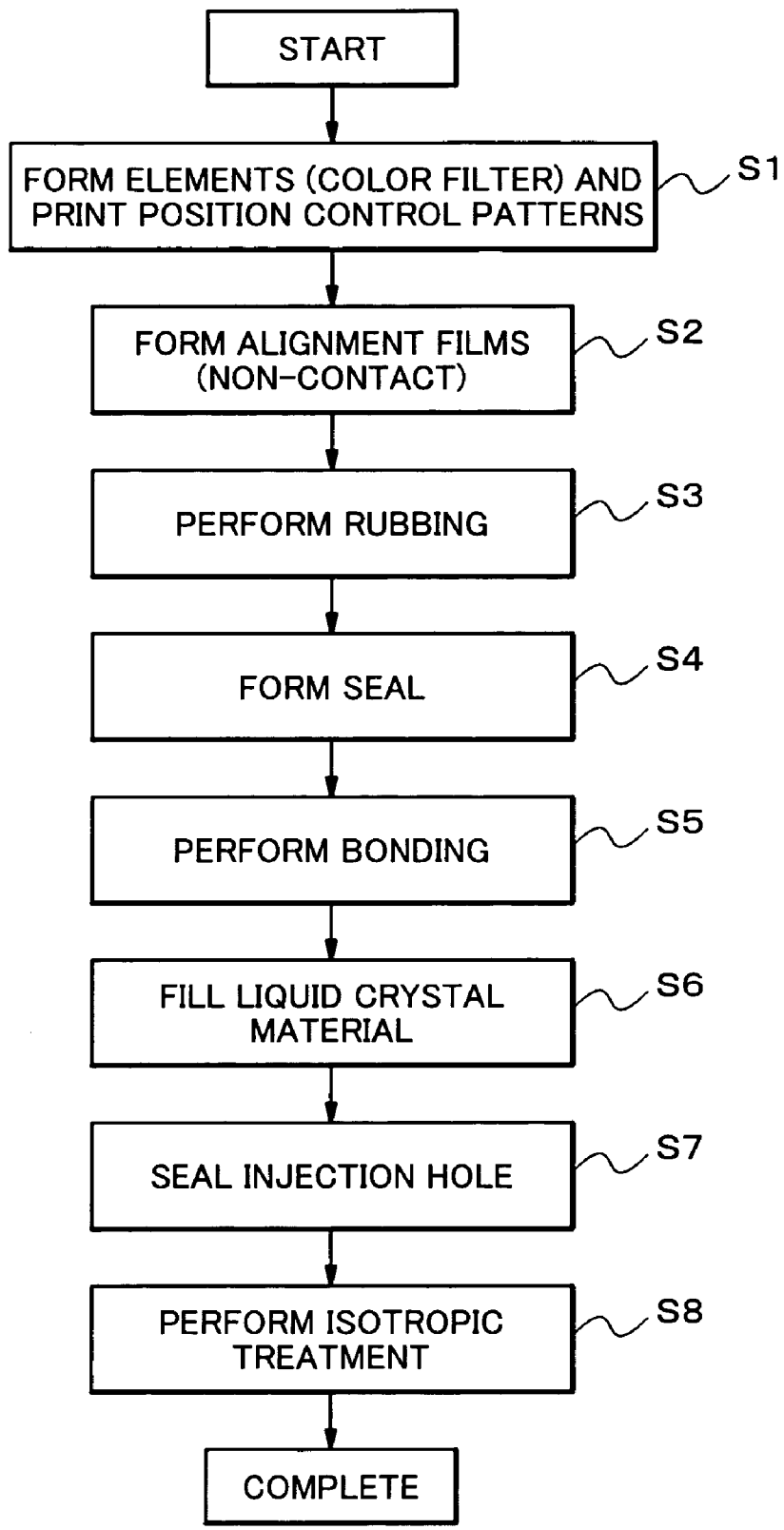
FIG. 2 is a flowchart which shows a part of the process of a method of manufacturing the LCD device of FIG. 1.

A method of manufacturing the LCD device as above is described. First, as shown in Step S1 of FIG. 2, elements and the pixel electrodes are formed on the array substrate 10, followed by forming a black matrix layer and a color filter layer on the color filter substrate 20. At the same time, the print position control patterns 60 for controlling the spreading as liquid of the droplets are formed between the sealing member 50 and the display region on the array substrate 10 and on the color filter substrate 20, the droplets being made of the alignment film material and being discharged from above the respective substrates.

Each of the print position control patterns 60 is formed as a region or a structure which can easily repel the alignment film material. The region which can easily repel the alignment film material is generally a region to which a low surface energy treatment was performed, as in a case of a first embodiment described below. Moreover, the structure which can easily repel the alignment film material is a structure in which at least concave structures or convex structures are formed, as in a case of second and third embodiments described below.

Next, as shown in Step S2, the alignment films are formed on the respective substrates 10 and 20 by the alignment film printing method of the non-contact type. Subsequently, as shown in Step S3, a rubbing treatment is performed to the alignment films by a well-known method. The processes after this rubbing treatment may be based on conventionally used techniques. That is, the sealing member 50 is formed in Step S4, the respective substrates 10 and 20 are bonded in Step S5, and liquid crystals are injected through a liquid crystal injection hole to form the liquid crystal layer 30 in Step 6. Moreover, the injection hole is sealed to form a liquid crystal panel in Step S7, and an isotropic treatment is performed to the liquid crystal panel to complete the liquid crystal panel in Step S8.

In the embodiments, the print position control patterns 60 for controlling the spreading as liquid of the alignment films 40 and 40a are formed between the sealing member 50 and each of the display regions on the respective substrates 10 and 20. Then, the alignment film material is printed in the display region, i.e., inside the print position control patterns 60, by the printing method of the non-contact type. This printed alignment film material spreads as liquid in the direction toward the periphery of the display region while leveling off by self-weight, and eventually, the spreading as liquid is controlled by the print position control patterns 60. Because it is possible to arbitrarily control the regions, in which the alignment films are formed, with the respective print position control patterns 60, it is possible to form alignment films having small variations in the film thickness between the center of the display region and the edge portion of the display region, by printing the alignment film material of the amount corresponding to a product of the surface area and the film thickness.

Moreover, because it is possible to control the spreading as liquid of the alignment film material with the configuration of the embodiments, the patterning of the edge portion of the alignment films is significantly facilitated. Moreover, it is possible to reduce the distance between the sealing member for bonding the opposed substrates and the display region, and to manufacture an LCD device consisting of a narrow frame. Furthermore, as a result that the patterning accuracy of the alignment films is improved, there is no display irregularity, and it is possible to improve the display quality of the LCD device.

(First Embodiment)

In the first embodiment of the invention, each of print position control patterns 60 is formed as a region which can easily repel the alignment film material, i.e., a region to which a low surface energy treatment is performed and which has high water repellency to the alignment film material.

Figure 4:
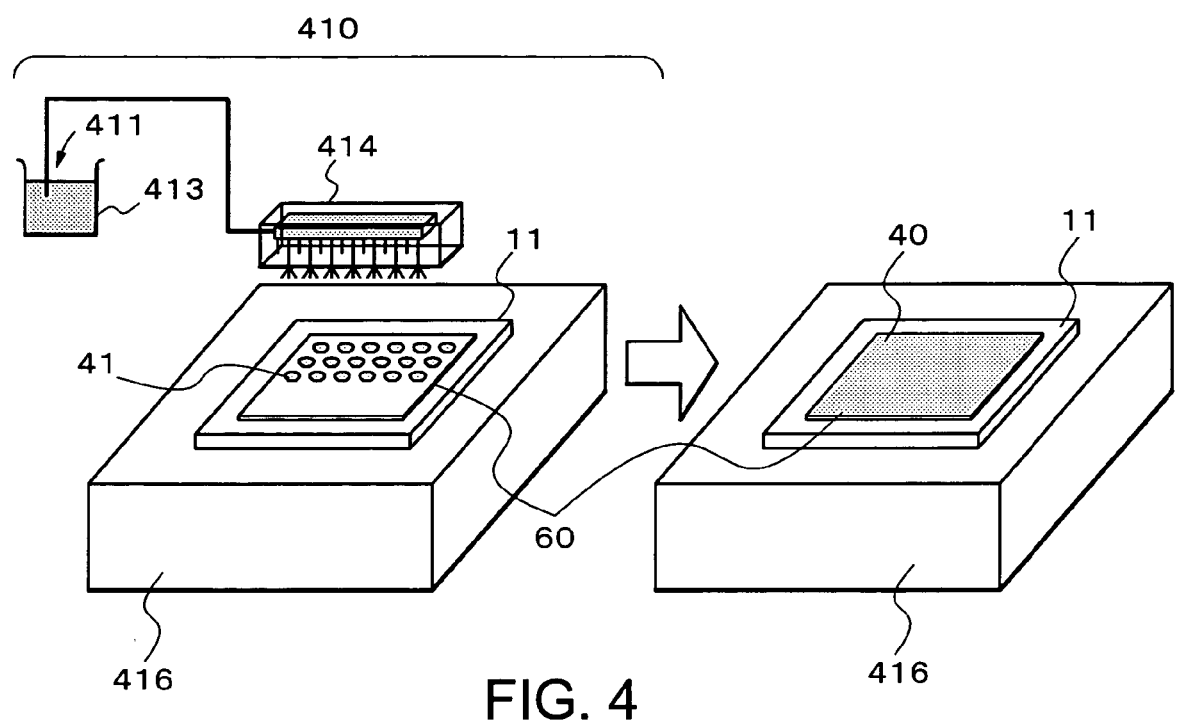
FIG. 4 is a schematic view for explaining the configuration of an alignment film printing apparatus used in the alignment film printing process of FIG. 3.

Referring to FIG. 4, an alignment film printing apparatus for printing the alignment films of this embodiment is described. An alignment film printing apparatus 410 includes a tank 413 for storing an alignment film material 411, a print head 414 for discharging the alignment film material 411 onto a substrate 11, and a stage 416 on which the substrate 11 is placed. The print head 414 is filled with the alignment film material 411 through a supply tube from the tank 413 of the alignment film material 411. In the print head 414, nozzles for discharging the alignment film material 411 at equal intervals are arranged, and each of the nozzles has a mechanism for arbitrarily discharging the alignment film material in response to a signal from a control unit (not shown).

In the printing process of the alignment films, as shown in FIG. 3A, first, TFTs and the print position control pattern 60 are formed on the array substrate. A color filter 80, a black matrix 70, and the print position control pattern 60 to which the low surface energy treatment has been performed are formed on the color filter substrate. In a region to which the low surface energy treatment has been performed, the surface energy becomes low, causing liquid thereon (i.e., the alignment film material in the invention) to be repelled easily. For example, a fluorine coating is a coating which reduces the surface energy. As the method of forming the print position control pattern 60 by means of this low surface energy treatment, for example, one may consider a method of selectively applying a water-repellent treatment material to the surface of the substrate, and evaporating the solvent, thereby fixing the water-repellent treatment material to the surface of the substrate. It is preferable that the water-repellent treatment material be a material such as a solvent obtained by dissolving general fluorine resin, hydrocarbon resin or silicone resin into an alcoholic solvent, which can easily repel the alignment material. Next, as shown in FIG. 3B, the print head 414 of the alignment film printing apparatus 410 scans the respective substrates 11 and 21 from a position above the substrates placed on the stage 416, and discharges the droplets 41 of the alignment film material 411 onto the respective substrates 11 and 21 from the print head 414, thereby performing the printing. As shown in FIG. 3C, the alignment film materials 411 printed on the respective substrates 11 and 21 spread by self-weight of the alignment film material, thereby leveling off the printing irregularity of the alignment film material. Here, in the regions where the print position control patterns 60 have been formed, the spreading as liquid of the alignment film material is suppressed. Accordingly, as shown in FIG. 3C, it is possible to form an arbitrary pattern of the alignment film material. Thereafter, as shown in FIG. 3D, by baking the substrate to which the alignment film material has been printed, the alignment films 40 and 40a can be formed.

Figure 5A:
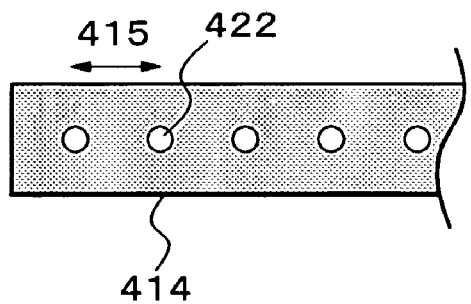
FIG. 5A is a perspective view for explaining a print head used in an alignment film dripping process of FIG. 3, and FIGS. 5B and 5C are partial plane views of the LCD device by the dripping of the alignment film of FIG. 3.
Figure 5B:
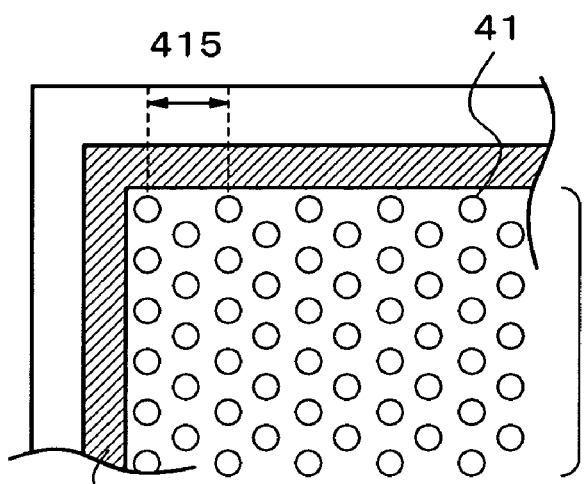

Next, the appearance of the printed alignment film material, the arrangement of the nozzles 412 of the print head 414, the appearance of the alignment film material 411 immediately after the printing, and the state where the alignment film material has been printed and has spread as liquid, and the like will be described. Referring to FIG. 5A, in the print head 414, nozzles 422 for discharging the alignment film material at a selected interval (at a nozzle pitch 415) are formed. FIG. 5B shows a state immediately after the print head 414 completed the printing, by scanning the substrate 11 from one edge to the other edge of the substrate 11 at a selected speed, and by subsequently scanning the substrate 11 after shifting the position of the head 414.

Figure 5C:
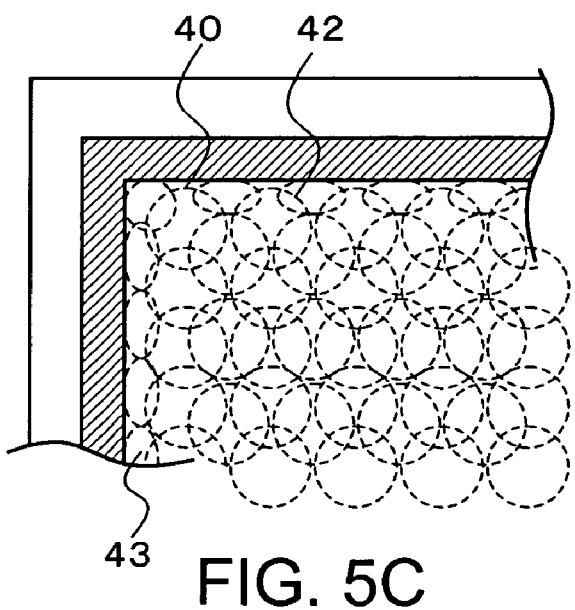

As apparent from FIGS. 5A to 5C, the printed droplets 41 of the alignment film material are arranged on the substrate at intervals corresponding to the scanning speed and the nozzle pitch 415. As shown in FIG. 5C, the droplets 41 of the alignment film material, which landed on the substrate 11, spread as liquid instantaneously and overlap with each other to level off. Here, as for the droplets 41 of the alignment film material, which landed on the periphery of the display region 90, regions 42 and 43 to spread as liquid are suppressed by the print position control pattern 60, and the edge portion of the alignment film 40 is controlled.

Figure 6A:
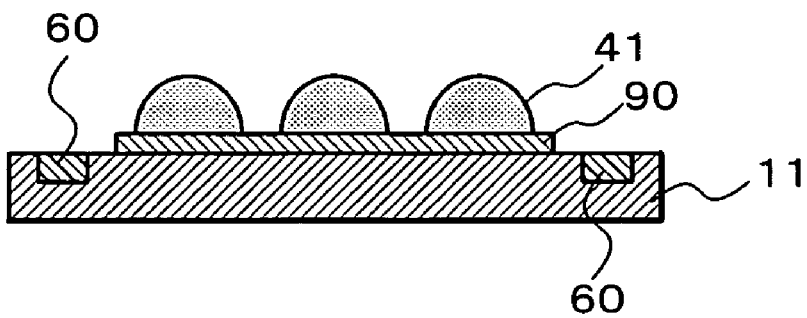
FIGS. 6A to 6D are partial sectional views of the LCD device for explaining a process of the spreading as liquid of the alignment film material of FIG. 3.
Figure 6B:
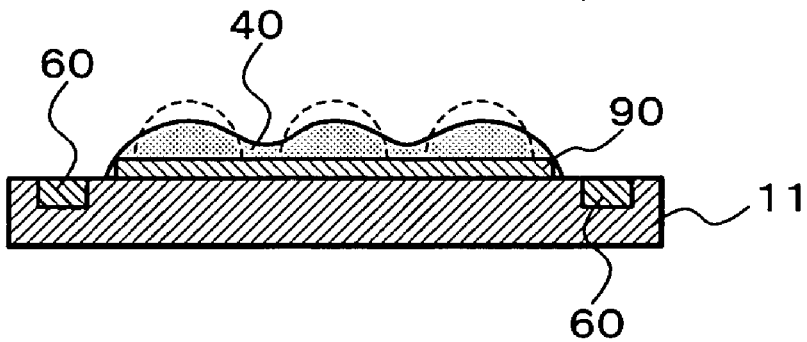
Figure 6C:
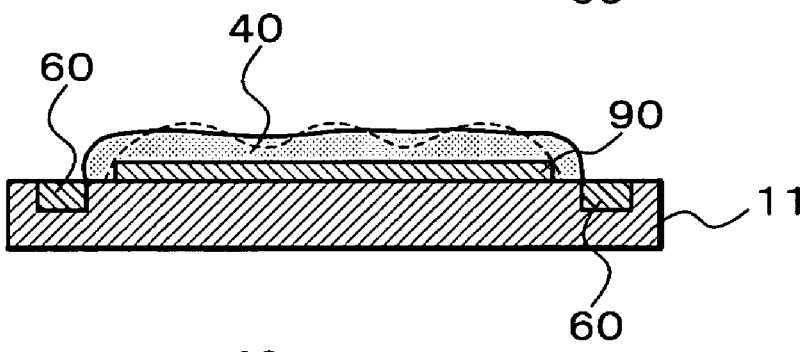
Figure 6D:
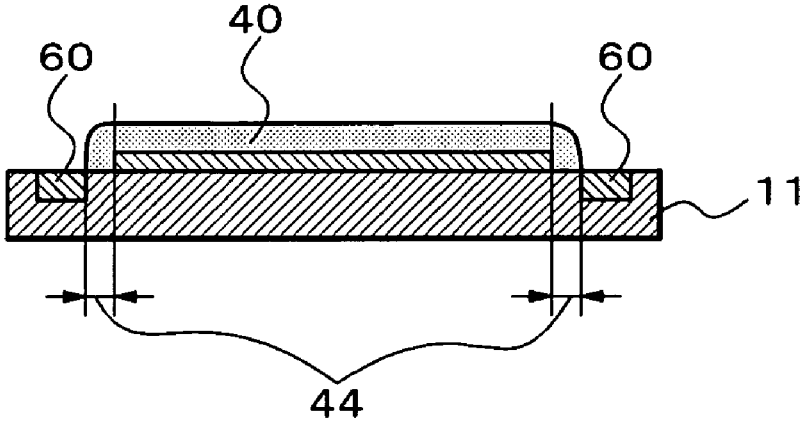

Next, the change of states of the film thickness of the alignment film material printed to the entire surface of the substrate is described. As shown in FIG. 6A, the printed droplets 41 of the alignment film material are applied to the display region 90 on the substrate 11. Here, the print position control pattern 60 is provided in the periphery of the display region 90 on the substrate 11. As shown in FIG. 6B, the droplets 41 of the alignment film material spread as liquid in the direction toward the periphery of the display region 90 while leveling off by self-weight, eventually spread as liquid to the print position control pattern 60, and is controlled by the print position control pattern 60 as shown in FIG. 6C. Accordingly, as shown in FIG. 6D, it is possible to narrow the region 44 in which the film thickness of the alignment film 40 is small.

Figure 7A:
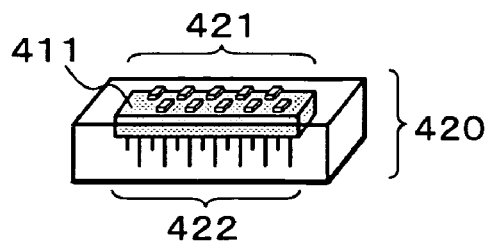
FIG. 7A is a perspective view of the print head of the alignment film printing apparatus concerning
Figure 7B:
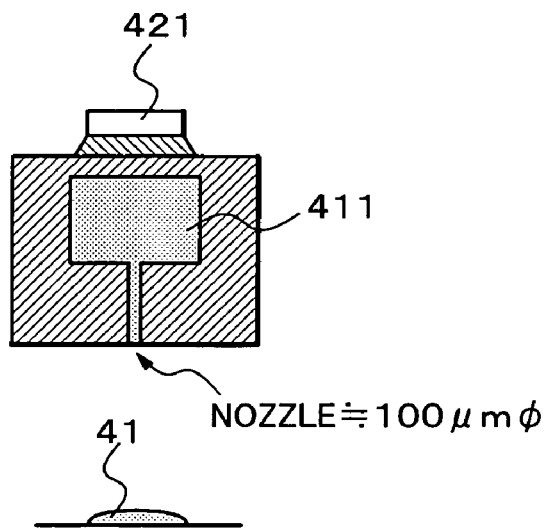
Figure 7C:
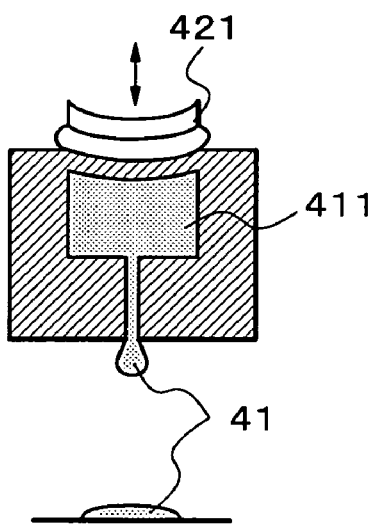
Figure 8:
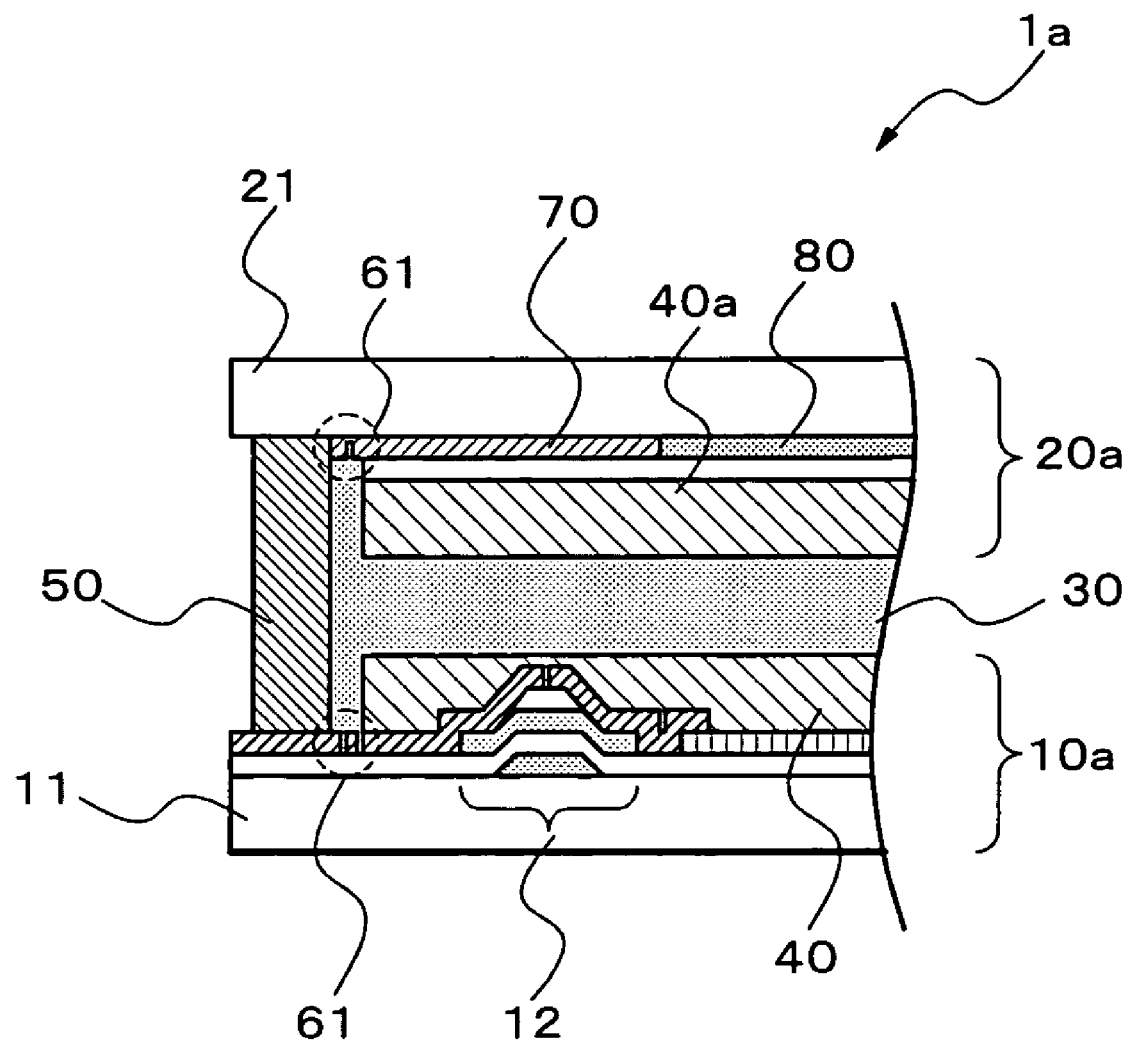
FIG. 8 is a cross sectional view showing a partial structure of an LCD device concerning a second embodiment of the invention.

Next, the print head in the alignment film printing apparatus 410 is described, the print head performing the non-contact printing of the alignment film. In a case where an ink-jet method is used as a print-head technique for performing this non-contact printing of the alignment film, an ink-jet head 420 is provided with a number of fine nozzles 422 in one surface of the head using piezoelectric elements 421, as shown in FIG. 7. A diameter of each of the nozzles 422 is about 100 μm. The piezoelectric elements 421 which vibrate with a voltage are respectively arranged in the nozzles 422. As shown in FIG. 7B, when a voltage is applied to the piezoelectric elements 421, the piezoelectric elements 421 deform, and the alignment film material 411 which is the liquid for the printing is pressed, thereby the droplets 41 of the alignment film material are discharged as shown in FIG. 7C.

In this embodiment, because it is possible to arbitrarily control the area in which the alignment film 40 is formed by this print position control pattern 60, it is possible to form an alignment film having small variations of the film thickness between the center of the display region and the edge portion of the display region by printing the alignment film material of the amount corresponding to a product of the surface area and the film thickness. In this way, in this embodiment, it is possible to control the edge portion of the periphery of the alignment film, and to control the uniformity of the film thickness, in the case where the alignment film is formed on the substrate by the non-contact method of printing the alignment film. Moreover, as shown in FIG. 6D, it is possible to narrow the region 44, in which the film thickness of the alignment film 40 is small, between the display region 90 and the print position control pattern 60. This makes it possible to realize the LCD device with a narrow frame.

(Second Embodiment)

This embodiment is characterized by forming, between a sealing member 50 and each of display regions on the respective substrates, the print position control patterns consisting of a concave structures or convex structures 61 capable of repelling the alignment film material which forms alignment films 40 and 40*a*.

This LCD device 1*a* includes an array substrate 10*a* as a first substrate, a color filter substrate 20*a* as a second substrate, the sealing member 50 joining the first and second substrates, and a liquid crystal layer 30 interposed between the first and second substrates. The alignment films 40 and 40*a* are provided on the surfaces of the respective substrates, the surfaces being in contact with the liquid crystal layer 30.

As for the print position control patterns of this embodiment, at least the concave structures or the convex structures 61 are formed by a photolithographic method. Moreover, the alignment films 40 and 40*a* are deposited by discharging the alignment material from above the respective substrates by the non-contact printing method and by baking them.

The manufacturing flow of this embodiment is described. As shown in FIG. 9A, first, a wiring layer 13, switching elements 12 and pixel electrodes are formed on the array substrate. As for the switching elements, although TFTs are preferably used, other switching elements such as MIM (Metal Insulator Metal) element may be used. The wiring layer 13 includes gate electrodes and source electrodes in the case where TFTs are used as the switching elements 12. Moreover, in order to form the gate electrodes and data electrodes, a metal film is deposited on the substrate 11 as shown in FIG. 9A.

Next, in order to form the concave structures or the convex structures of the print position control patterns 61 between the region to which the seal are applied and the wiring pattern region together with the display region, as shown in FIG. 9B, photoresist is applied to the substrate, and is exposed and developed into an arbitrary photoresist pattern 14. Thereafter, as shown in FIG. 9C, by etching with the use of this photoresist pattern 14 as a mask, print position control patterns including the concave structures or convex structures 61 are formed simultaneously with the wiring patterns. Here, as for the material for forming the print position control patterns, it is needless to say that a similar effect can be obtained not only with the metal film, but also with a conductive film, an insulating film and an organic film. Moreover, because it is possible to form the print position control patterns simultaneously with the wiring patterns, contact holes and the like, it is possible to perform the formation in the same way as the conventional process without adding a new manufacturing process.

Subsequently, as shown in FIG. 9D, the alignment film material is printed to the first substrate by using the non-contact alignment film printing method. The printed alignment film material starts to spread as liquid in portions other than the print position control patterns 61 immediately after the printing. Thereafter, drying and baking are performed to form the alignment films 40 and 40*a* of a desired film thickness. Here, the purpose of the print position control patterns is to form the concave structures or the convex structures 61, and therefore the etching amount may not be equivalent to that for forming the wirings.

Next, a method of manufacturing the second substrate 20*a* including the color filter is described. As shown in FIG. 9A, a black matrix layer 71 formed between pixels is formed of a resin and a metal layer by a well-known method. As in the case of the first substrate 10*a*, as shown in FIG. 9B, photoresist is applied to the formed black matrix layer 71, and is exposed and developed into the arbitrary photoresist pattern 14. On the print position control pattern 61, a pattern is formed so that fine concavo-convex structures are formed. Thereafter, as shown in FIG. 9C, by etching with the use of this photoresist pattern 14 as a mask, the black matrix layer 71 and a print position control pattern constituting of the fine concavo-convex structures are formed. Thereafter, on the second substrate 21, a color filter layer made of dye or pigment is formed by a well-known method, thereby forming ITO electrodes. Here, as for the material for forming the fine concave structures or fine convex structures, it is needless to say that a similar effect is obtained not only with the material used for the black matrix layer 71, but also with the color filter material and the other materials.

Subsequently, as shown in FIG. 9D, the alignment film material is printed to the second substrate 20*a* by using the non-contact alignment film printing method. The printed alignment film material starts to spread as liquid in portions other than the print position control pattern 61 immediately after the printing. Thereafter, drying and baking are performed to form the alignment film 40*a* of a desired film thickness. Here, the first and second substrates may be a type used for a liquid crystal mode of a vertical electric field control system in which a voltage is applied between the substrates, or a type used for a liquid crystal mode of a horizontal electric field control system in which a voltage is applied in the direction parallel to the substrates.

As for the first and second substrates formed in this manner, an alignment treatment such as a rubbing treatment or the like is performed to the alignment films 40 and 40*a*, and then the substrates are bonded to form an LCD device. As for the manufacturing method after the alignment treatment, a well-known technique is used, so the description thereof is omitted.

Figure 10A:
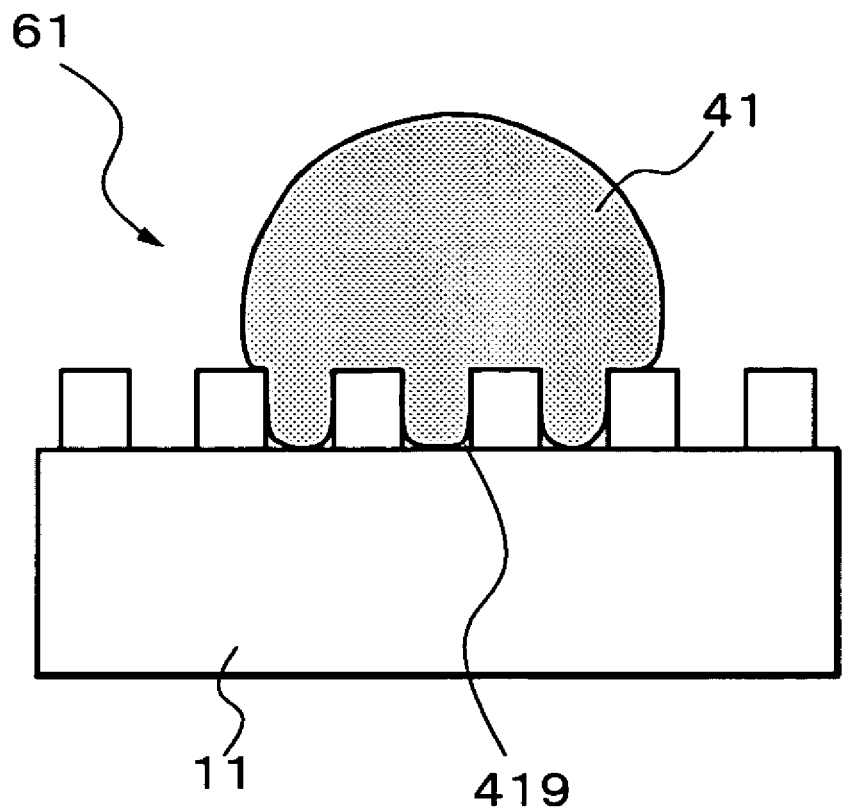
FIGS. 10A and 10B are cross sectional views for explaining the alignment film printing process of FIG. 8.
Figure 10B:
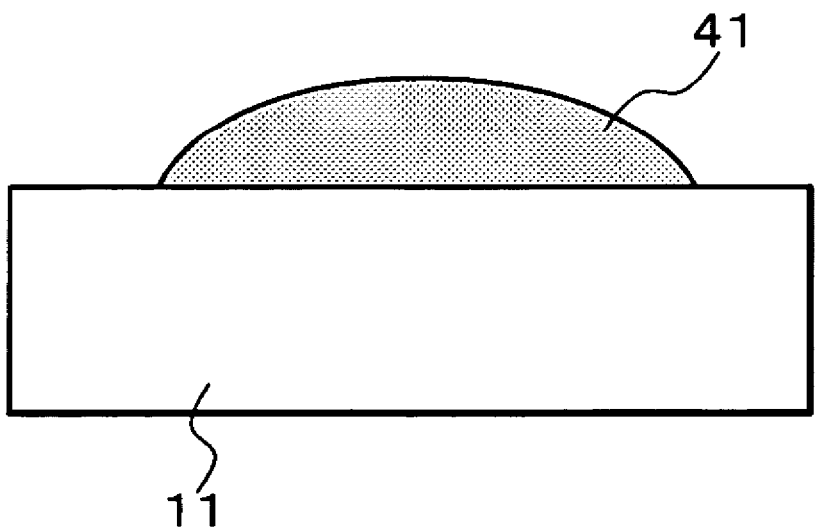

Next, the action principle of the print position control patterns including the fine concave structures or fine convex structures 61 is described. FIGS. 10A is a side view showing a state where the droplet 41 of the alignment film material is dripped onto the substrate 11, on which the fine concave structures or the fine convex structures are formed. FIG. 10B, is a side view showing a state where the droplet 41 of the alignment film material is dripped onto a flat substrate. Referring to FIG. 10A, on the substrate 11, there are formed the concave structures or convex structures 61 smaller than the droplet 41 of the alignment film material which landed thereon. In order to obtain the effect of the print position control patterns 61, the width of a depression of each of the concave portions needs to be reduced. If the width of the depression of each of the concave portions is reduced, air interfaces 419 are formed between the substrate and the droplet 41 which has been printed to the substrate, and the droplet 41 can easily be repelled, thereby making it possible to control the spreading as liquid of the droplet 41.

The diameter of the droplet 41 discharged from the print head is approximately from 50 μm to 100 μm. The diameter of each of the droplets 41 at the time when the droplets 41 which landed on the substrate spread as liquid is approximately 1 mm. The nozzle pitch of the print head is set to approximately from 50 μm to 100 μm. In order to form air interfaces between the substrate and the droplet 41 which has been discharged to the substrate, the width of the depression of each of the concave portions needs to be 50 μm or less. Moreover, in order to enlarge the surface area of the air interfaces which the droplet comes in contact with, the region in which the concave portions are formed needs to be enlarged. Particularly, a significant effect of the print position control was obtained by setting the area ratio of the concave portions to each of the print position control patterns 61 to ½ or more.

Furthermore, with regard to the depth of the depression of the print position control patterns 61 of the concave structures or convex structures, the inventor conducted verification by carrying out a printing experiment. As a result, data shown in Table 1 as follows were obtained. This table relates to the depression depth of the concave portions or convex portions and to the controllability of the edge portion of the alignment film concerning the second embodiment.

TABLE 1

| Depression depth of the concave portions or convex portions (nm) | Controllability of the edge portion of the alignment film |
|---|---|
| 0 | X |
| 50 | Δ |
| 100 | ○ |
| 150 | ○ |
| 200 | ○ |

Results in Table 1 confirmed that, in the case where the alignment film material is printed by using the non-contact alignment film printing method, the controllability of the edge portion of the alignment film was improved by setting the depression depth of the concave structures or convex structures to 50 nm or more, and there was a significant improvement in a case of setting thereof to 100 nm. In order to improve the print position controllability of the alignment film material, the depth of the depression of the concave structures or convex structures needs to be 50 nm or more. It is preferably 100 nm or more.

Figures 11A, 11B:
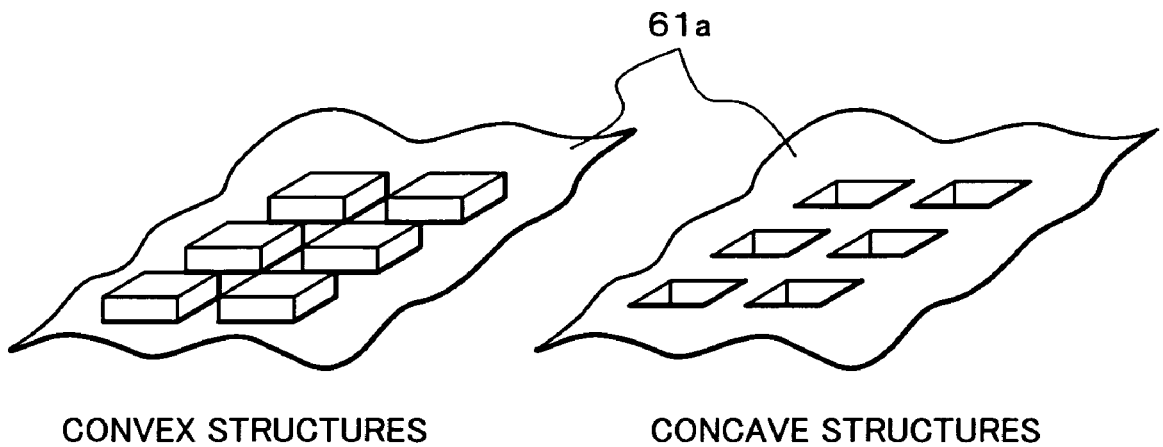
FIGS. 11A and 11B are perspective views of an example of a print position control pattern 61 of FIG. 8.
Figures 12A, 12B:
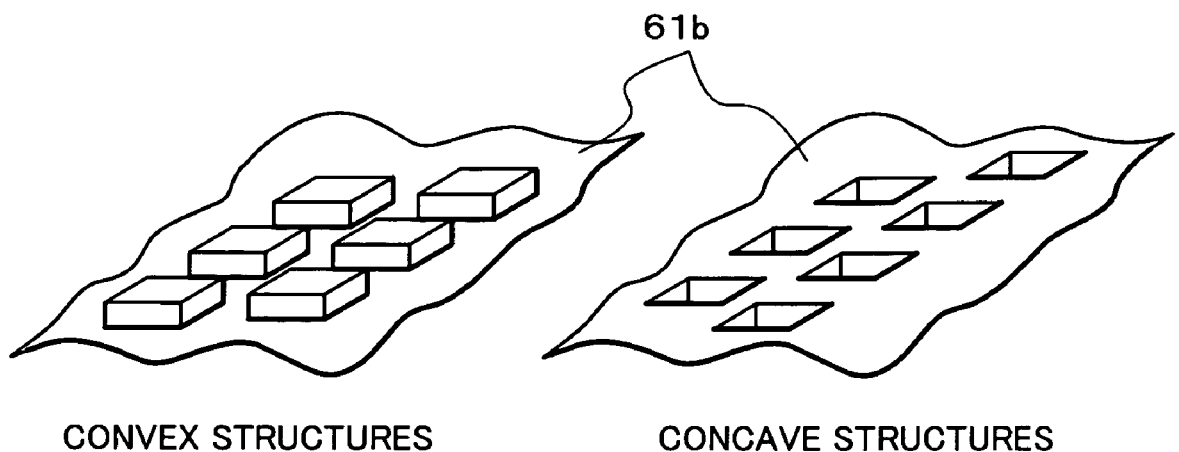
FIGS. 12A and 12B are perspective views of other examples of the print position control patterns 61 of FIG. 8.
Figure 13A:
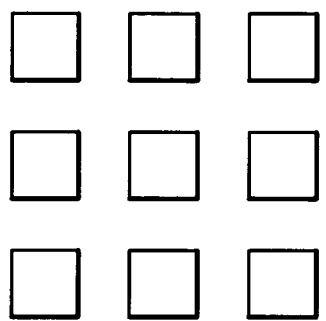
FIGS. 13A to 13C are plane views of still other examples of the print position control patterns 61 of FIG. 8.
Figure 13B:
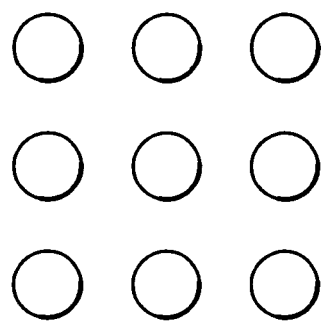
Figure 13C:
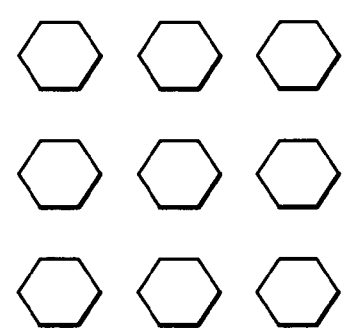

Here, the fine concave structures or fine convex structures formed in the print position control pattern 61 may be a print position control pattern 61a of concave structures or convex structures formed in a matrix as shown in FIGS. 11A and 11B. Moreover, as shown in FIGS. 12A and 12B, a print position control pattern 61b of concave structures or convex structures formed in a delta arrangement or a staggered arrangement may be used. Moreover, a print position control pattern arranged at random may be used. Moreover, the shape of the concave structures or convex structures to be formed in the print position control pattern may be a square, a circle or a polygon such as a hexagon, as shown in FIGS. 13A to 13C.

According to this embodiment, it is possible to arbitrarily control the area, in which the alignment films 40 and 40a are formed, by the print position control patterns 60 represented by the concave structures or convex structures 61. Therefore, it is possible to form alignment films having small variations in the film thickness between the center of the display region and the edge portion of the display region, by printing the alignment film material of the amount corresponding to a product of the surface area and the film thickness. In this way, this embodiment makes it possible to control the edge portions of the respective alignment films and to control the uniformity of the film thickness, in the case of forming the alignment films by the non-contact method of printing alignment films to the respective substrates. Moreover, it is possible to form the concave structures or convex structures 61 simultaneously with the forming of the elements on the substrate, such as wiring patterns. This makes it possible to form alignment films having small variations in the film thickness between the center of the display region and the edge portion of the display region without adding a new manufacturing process, and it is possible to control the edge portions of the respective alignment films.

(Third Embodiment)

Figure 14:
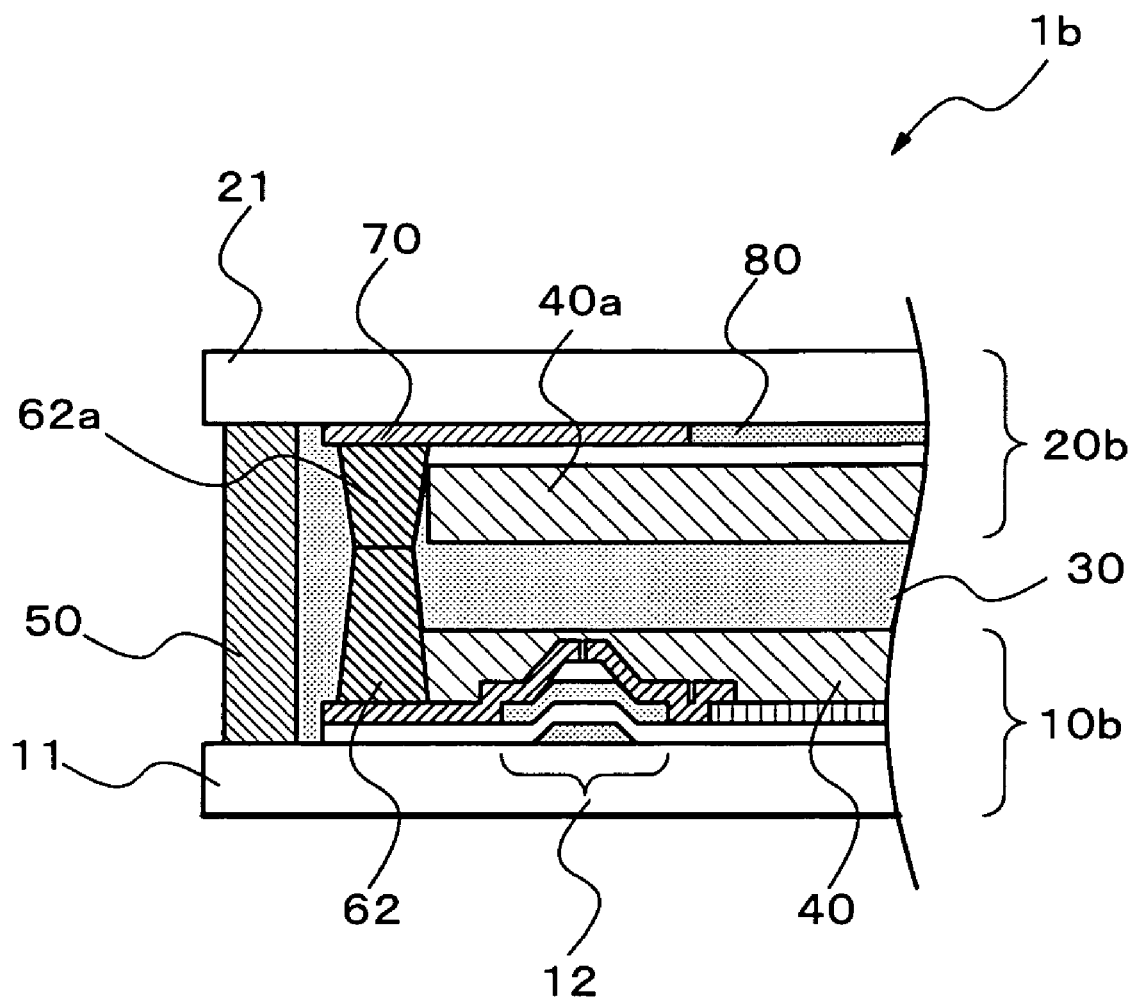
FIG. 14 is a cross sectional view showing a partial structure of an LCD device concerning a third embodiment of the invention.

Next, a third embodiment as a specific embodiment of the invention is described with reference to FIG. 14. This embodiment is characterized by forming, between a sealing member 50 and each of display regions on the respective substrates, pillar-shaped bodies 62 and 62a each made of a pillar-shaped member as print position control patterns on the respective substrates, the print position control patterns being capable of repelling the alignment film material which forms alignment films 40 and 40a. The pillar-shaped bodies 62 and 62a are provided opposed to each other as to support the first and second substrates at a selected space. The pillar-shaped bodies 62 and 62a control the range which the alignment films spread as liquid by enclosing the peripheries of the alignment films 40 and 40a, and thereby making it possible to control the positions where the alignment films 40 and 40a are formed.

An LCD device 1b of this embodiment includes an array substrate 10b as a first substrate, a color filter substrate 20b as a second substrate, the sealing member 50 joining the first and second substrates, a liquid crystal layer 30 interposed between the first and second substrates, and the pillar-shaped bodies 62 and 62a. The alignment films 40 and 40a are provided on the surfaces of the respective substrates, the surfaces being in contact with the liquid crystal layer 30.

These pillar-shaped bodies 62 and 62a are formed of resin such as photoresist or the like by a photolithographic method. For example, the pillar-shaped body 62a can be also formed by depositing the color filter layer 80. Moreover, the pillar-shaped body 62a can be also formed by patterning resin or the like. It should be noted that, in the case of the array substrate 10b, it is preferable to pattern resin or the like.

In addition, this embodiment can be considered as the one made by enlarging the convex structures for controlling the spreading as liquid shown in FIGS. 11A and 12A, and by causing the enlarged convex portions to also serve as the pillars supporting the respective substrates. As for the arrangement of the pillar-shaped bodies, the pillar-shaped bodies need to be formed as to enclose the alignment films 40 and 40a when viewed from the direction normal to the first substrate (or the second substrate). Moreover, because the sealing member 50 is also arranged further outside these pillar-shaped bodies, these pillar-shaped bodies enclose the alignment films 40 and 40a inside the sealing member 50, as in the case of the sealing member.

According to this embodiment, it is possible to arbitrarily control the area, in which the alignment film 40 can be formed, by the print position control pattern 60 represented by the pillar-shaped body 62. Moreover, it is possible to arbitrarily control the area, in which the alignment film 40a can be formed, by the print position control pattern 60 represented by the pillar-shaped body 62a. This makes it possible to form the alignment films having small variations in the film thickness between the center of the display region and the edge portion of the display region, by printing the alignment film material of the amount corresponding to a product of the surface area and the film thickness. In this way, this embodiment makes it possible to control the edge portions of the respective alignment films and to control the uniformity of the film thickness, in the case of forming the alignment films by the non-contact method of printing the alignment films to the substrates. Because the pillar-shaped bodies 62 and 62a are provided as opposed to each other, they can support the first substrate 10a and the second substrate 20b with a selected space, contributing to the maintenance of the cell gap.

(Fourth Embodiment)

Next, a fourth embodiment as a specific embodiment of the invention is described with reference to the drawings. In FIG. 7 of the first embodiment, as the non-contact alignment film printing method, the ink-jet method using the piezoelectric elements was described as the print head of the alignment film printing apparatus. On the other hand, a bubble jet (Registered Trademark) method can be used. A print head using this bubble jet method is described.

Figure 15A:
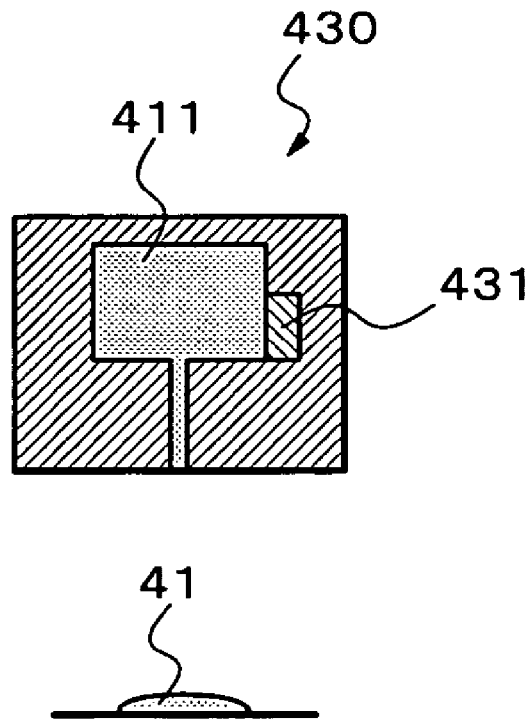
FIGS. 15A and 15B are cross sectional views showing another print head of the alignment film printing apparatus concerning a fourth embodiment of the invention.
Figure 15B:
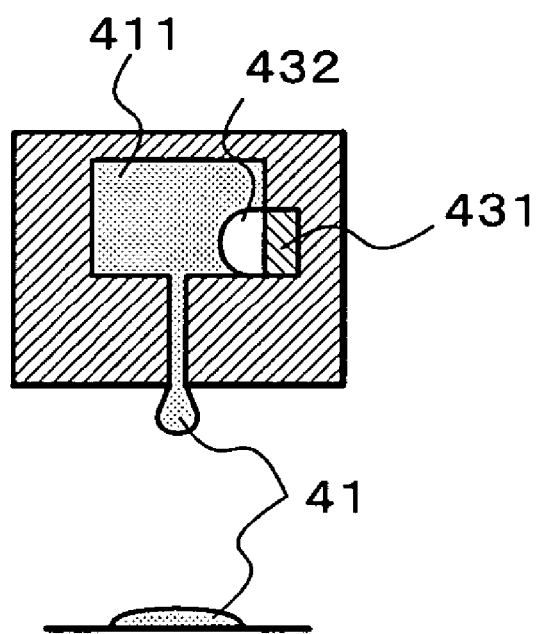

As shown in FIG. 15A, in a bubble jet print head 430 using this bubble jet method, a heater 431 is mounted in a tank filled with the alignment film material 411. As shown in FIG. 15B, when electric power is supplied to the heater 431 to heat the alignment film material 411, the alignment film material 411 is expanded and air bubbles 432 are generated. Accordingly, the alignment film material 411 is pressed to discharge a droplet 41 of the alignment film material.

Although the preferred embodiments have been specifically described hereinabove, the invention is not limited to these embodiments and various modifications and applications are possible.

For example, as the non-contact alignment film printing method, a dispense method, which presses and discharges liquid by air can be also used. It should be noted that the method of printing alignment films can be applied to the non-contact methods of printing alignment films to the substrate, but is not limited to these methods. Moreover, according to the invention, a similar effect can be obtained not only by the non-contact printing method but also by a flexographic printing method.

Moreover, if the non-contact ink-jet method is used for forming the print position control patterns and printing the alignment films, the printing apparatus will not come in contact with the substrate, therefore there will be no transfer of foreign substances or the like from the device to the substrate, thereby bringing about an effect of decreasing the defects due to the foreign substances.

Moreover, in the embodiments described above, as shown in FIG. 2, the manufacturing method is as follows: the substrates 10 and 20 are bonded in Step S5, the liquid crystal layer 30 is formed by filling liquid crystal material between the substrates in Step S6, and the liquid crystal injection hole is sealed in Step S7. On the other hand, the invention can also be applied to a method of manufacturing an LCD device by a drip bonding method by dripping liquid crystals to one substrate, and subsequently bonding the both substrates by use of a sealing member, thereby producing a liquid crystal panel. The sequence of the method is known as one drop fill (ODF) process.

Moreover, the LCD devices of the first to third embodiments described above are the LCD devices in which the color filter is formed on the color filter substrate. On the other hand, the print position control patterns of the invention can also be applied to an LCD device of a color filter-on TFT type (COT type), for example, in which the color filter is also formed in the array substrate. The invention can be applied to an LCD device in which both substrates are bonded with a sealing member while interposing a liquid crystal layer between an array substrate, on which a color filter is formed, and an opposed substrate.

Although preferred embodiments of the invention has been described with reference to the drawings, it will be obvious to those skilled in the art that various changes or modifications may be made without departing from the true scope of the invention.

What is claimed is:

1. A liquid crystal display device comprising:
    a pair of substrates each including a display region and a peripheral region around the display region;
    a liquid crystal layer sandwiched between the substrates;
    a sealing member provided between the peripheral regions of the pair of substrates, the sealing member sealing the liquid crystal layer;
    alignment films formed of alignment film materials, a first alignment film provided between a surface of a first of the pair of substrates and the liquid crystal layer, and a second alignment film provided between a surface of a second of the pair of substrates and the liquid crystal layer; and
    print position control patterns provided between the sealing member and the display region, the print position control patterns each being configured to repel the alignment film materials of the alignment films,
    wherein each print position control pattern comprises a low energy surface material, the low energy surface material configured to cause a liquid thereon to be repelled.

2. The liquid crystal display device according to claim 1, wherein each of the print position control patterns is arranged between the display region and the sealing member.

3. The liquid crystal display device according to claim 1, wherein the low energy surface material is a fluorine coating.

4. A liquid crystal display device comprising:
    a pair of substrates each including a display region and a peripheral region around the display region;
    a liquid crystal layer sandwiched between the substrates;
    a sealing member provided between the peripheral regions of the pair of substrates, the sealing member sealing the liquid crystal layer;
    alignment films formed of alignment film materials, a first alignment film provided between a surface of a first of the pair of substrates and the liquid crystal layer, and a second
    alignment film provided between a surface of a second of the pair of substrates and the liquid crystal layer; and
    print position control patterns provided between the sealing member and the display region, the print position control patterns each being configured to repel the alignment film materials of the alignment films,
    wherein a structure of each of the print position control patterns has a structural pattern comprised of at least one of repeated concave structures and repeated convex structures.

5. The liquid crystal display device according to claim 4, wherein a width of each of depression portions of the repeated concave structures or the repeated convex structures of each of the print position control patterns is 50 μm or less.

6. The liquid crystal display device according to claim 5, wherein an area ratio of the depression portions of the repeated concave structures or the repeated convex structures of each of the print position control patterns to a region of the print position control pattern is ½ or more.

7. The liquid crystal display device according to claim 5, wherein a depth of each of depressions of the repeated concave structures or the repeated convex structures of each of the print position control patterns is 50 nm or more.

8. The liquid crystal display device according to claim 4, wherein an area ratio of the depression portions of the repeated concave structures or the repeated convex structures of each of the print position control patterns to a region of the print position control pattern is ½ or more.

9. The liquid crystal display device according to claim 8, wherein a depth of each of depressions of the repeated concave structures or the repeated convex structures of each of the print position control patterns is 50 nm or more.

10. The liquid crystal display device according to claim 4, wherein a depth of each of depressions of the repeated concave structures or the repeated convex structures of each of the print position control patterns is 50 nm or more.

11. A method of manufacturing a liquid crystal display device including a pair of substrates, each including a display region and a peripheral region around the display region, a liquid crystal layer sandwiched between the pair of substrates, and a sealing member provided between the peripheral regions of the pair of substrates, the sealing member configured to seal the liquid crystal layer, the method comprising the steps of:
forming print position control patterns outside the respective display regions of the pair of substrates;
treating the print position control patterns with a low surface energy treatment to have a high repellency to alignment film materials of alignment films;
forming the alignment films on each of the display regions of the pair of substrates by a noncontact printing method;
bonding the pair of substrates with the sealing member; and
interposing the liquid crystal layer between the pair of substrates.

12. The method of manufacturing a liquid crystal display device according to claim 11, wherein the treating step causes a surface energy of the print position control patterns to become low so as to cause liquid alignment film materials thereon to be repelled.

13. The method of manufacturing a liquid crystal display device according to claim 11, wherein the treating step comprises the sub-steps of:
selectively applying a water-repellent treatment material and a solvent to a surface of the substrates; and
evaporating the solvent, thereby fixing the water-repellent treatment material to the surface of the substrates.

14. The method of manufacturing a liquid crystal display device according to claim 13,
wherein the waterrepellent treatment material is obtained by dissolving one of general fluorine resin, hydrocarbon resin and silicone resin into the solvent, and
wherein the solvent is an alcoholic solvent.

15. A method of manufacturing a liquid crystal display device including a pair of substrates, each including a display region and a peripheral region around the display region, a liquid crystal layer sandwiched between the pair of substrates, and a sealing member provided between the peripheral regions of the pair of substrates, the sealing member configured to seal the liquid crystal layer, the method comprising the steps of:
forming print position control patterns configured to repel alignment film materials forming alignment films, outside the respective display regions of the pair of substrates;
forming the alignment films on each of the display regions of the pair of substrates by a noncontact printing method;
bonding the pair of substrates with the sealing member; and
interposing the liquid crystal layer between the pair of substrates,
wherein the structures are formed of regions including concave structures or convex structures which suppress the spreading of printing the alignment films.

16. The method of manufacturing a liquid crystal display device according to claim 15, wherein a width of each of depression portions of the concave structures or the convex structures of each of the print position control patterns is 50 µm or less.

17. The method of manufacturing a liquid crystal display device according to claim 16, wherein an area ratio of the depression portions of the concave structures or the convex structures of each of the print position control patterns to a region of the print position control pattern is ½ or more.

18. The method of manufacturing a liquid crystal display device according to claim 16, wherein a depth of each of depressions of the concave structures or the convex structures of each of the print position control patterns is 50 nm or more.

19. The method of manufacturing a liquid crystal display device according to claim 15, wherein an area ratio of the depression portions of the concave structures or the convex structures of each of the print position control patterns to a region of the print position control pattern is ½ or more.

20. The method of manufacturing a liquid crystal display device according to claim 19, wherein a depth of each of depressions of the concave structures or the convex structures of each of the print position control patterns is 50 nm or more.

21. The method of manufacturing a liquid crystal display device according to claim 15, wherein a depth of each of depressions of the concave structures or the convex structures of each of the print position control patterns is 50 nm or more.

22. The method of manufacturing a liquid crystal display device according to claim 15, wherein the regions including the concave structures or convex structures which suppress the spreading of printing the alignment films are formed by a photolithographic method.

23. The method of manufacturing a liquid crystal display device according to claim 14, wherein the print position control patterns are formed by a noncontact organic material printing method.

24. The method of manufacturing a liquid crystal display device according to claim 11, wherein the non contact printing method is based on an ink-jet printing method.

25. The method of manufacturing a liquid crystal display device according to claim 24, wherein the ink-jet printing method causes droplets of the alignment film material to be discharged by controlling piezoelectric elements.

26. The method of manufacturing a liquid crystal display device according to claim 24, wherein the ink-jet printing method causes droplets of the alignment film material to be discharged by controlling heaters.

27. The method of manufacturing a liquid crystal display device according to claim 11, wherein the non-contact printing method is based on a dispense printing method.

28. The method of manufacturing a liquid crystal display device according to claim 11, wherein the low surface energy treatment is a fluorine coating.

29. The method of manufacturing a liquid crystal display device according to claim 15, wherein the non-contact printing method is based on an ink-jet printing method.

30. The method of manufacturing a liquid crystal display device according to claim 15, wherein the non-contact printing method is based on a dispense printing method.

* * * * *

UNITED STATES PATENT AND TRADEMARK OFFICE
CERTIFICATE OF CORRECTION

PATENT NO.        : 7,646,458 B2                                        Page 1 of 1
APPLICATION NO.   : 11/582453
DATED             : January 12, 2010
INVENTOR(S)       : Shinya Onda It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 381 days.

Signed and Sealed this

Twenty-eighth Day of December, 2010

David J. Kappos
*Director of the United States Patent and Trademark Office*